United States Patent
Pettey et al.

(10) Patent No.: US 7,979,592 B1
(45) Date of Patent: Jul. 12, 2011

(54) VIRTUALIZATION BRIDGE DEVICE

(75) Inventors: Christopher J. Pettey, Cedar Park, TX (US); Stephen Glaser, Austin, TX (US); Asif Khan, Cedar Park, TX (US); Jon Nalley, Leander, TX (US); Stephen Rousset, Roundrock, TX (US); Tom Saeger, Roundrock, TX (US); Robert Haskell Utley, Roundrock, TX (US)

(73) Assignee: Emulex Design and Manufacturing Corporation, Costa Mesa, CA (US)

(*) Notice: Subject to any disclaimer, the term of this patent is extended or adjusted under 35 U.S.C. 154(b) by 47 days.

(21) Appl. No.: 12/028,801

(22) Filed: Feb. 9, 2008

Related U.S. Application Data

(60) Provisional application No. 60/888,984, filed on Feb. 9, 2007.

(51) Int. Cl.
*G06F 3/00* (2006.01)

(52) U.S. Cl. .................. 710/3; 710/8; 709/205

(58) Field of Classification Search .......... 710/8, 3, 710/240, 302; 370/419; 709/205, 212, 213, 709/214, 215, 216
See application file for complete search history.

(56) References Cited

U.S. PATENT DOCUMENTS

| | | | |
|---|---|---|---|
| 6,728,258 B1 * | 4/2004 | Okada et al. ................. 370/463 |
| 7,188,209 B2 | 3/2007 | Pettey et al. |
| 7,219,183 B2 | 5/2007 | Pettey et al. |
| 7,457,906 B2 | 11/2008 | Pettey et al. |
| 7,493,416 B2 | 2/2009 | Pettey |
| 7,502,370 B2 | 3/2009 | Pettey |
| 7,512,717 B2 | 3/2009 | Pettey |
| 7,617,333 B2 | 11/2009 | Pettey |
| 7,620,064 B2 | 11/2009 | Pettey et al. |
| 7,620,066 B2 | 11/2009 | Pettey et al. |
| 7,657,663 B2 * | 2/2010 | Freimuth et al. ................. 710/5 |
| 7,664,909 B2 | 2/2010 | Pettey |
| 7,698,483 B2 | 4/2010 | Pettey et al. |
| 7,706,372 B2 | 4/2010 | Pettey et al. |
| 7,707,346 B2 | 4/2010 | Deshpande et al. |
| 7,743,197 B2 | 6/2010 | Chavan et al. |
| 7,782,893 B2 | 8/2010 | Pettey et al. |
| 7,836,211 B2 | 11/2010 | Pettey et al. |
| 7,882,330 B2 | 2/2011 | Haertel et al. |

(Continued)

OTHER PUBLICATIONS

Michael Krause, I/O Virtualization and Sharing, 2006, microsoft winhec, pp. 1-51.*

*Primary Examiner* — Alford W Kindred
*Assistant Examiner* — Ernest Unelus
(74) *Attorney, Agent, or Firm* — Rory Rankin; James W. Huffman

(57) ABSTRACT

A computer system includes a shared I/O device including functions providing access to device local memory space, and a plurality of roots coupled to the shared I/O device via a switch fabric. A first root assigns a first address in a first root memory space to a first function. A second root assigns a second address in a second root memory space to a second function. The switch fabric maps the first root memory space to a first portion of device local memory space and the second root memory space to a second portion of device local memory space. Subsequently, the switch receives a data transaction request from the first root targeted to the first address, translates the first address to a corresponding location in the first portion of the device local memory space based on the mapping, and routes the data transaction request to the I/O device.

24 Claims, 18 Drawing Sheets

U.S. PATENT DOCUMENTS

| | | | |
|---|---|---|---|
| 2004/0172494 A1* | 9/2004 | Pettey et al. | 710/305 |
| 2006/0242354 A1* | 10/2006 | Johnsen et al. | 710/316 |
| 2006/0253619 A1* | 11/2006 | Torudbakken et al. | 710/31 |
| 2008/0137677 A1* | 6/2008 | Boyd et al. | 370/419 |
| 2008/0147898 A1* | 6/2008 | Freimuth et al. | 710/8 |
| 2008/0147904 A1* | 6/2008 | Freimuth et al. | 710/22 |
| 2008/0147937 A1* | 6/2008 | Freimuth et al. | 710/104 |
| 2008/0147938 A1* | 6/2008 | Freimuth et al. | 710/105 |
| 2008/0147943 A1* | 6/2008 | Freimuth et al. | 710/240 |
| 2008/0147959 A1* | 6/2008 | Freimuth et al. | 711/100 |
| 2008/0148032 A1* | 6/2008 | Freimuth et al. | 713/1 |
| 2008/0148295 A1* | 6/2008 | Freimuth et al. | 719/324 |

* cited by examiner

| Byte Offset | | | | |
|---|---|---|---|---|
| Device ID 912 | Vendor ID 910 | | | 00h |
| Status 916 | Command 914 | | | 04h |
| Class Code 920 | | | Revision ID 918 | 08h |
| BIST 928 | Header Type 926 | Master Latency Timer 924 | Cache Line Size 922 | 0Ch |
| Base Address Registers 930 | | | | 10h |
| | | | | 14h |
| | | | | 18h |
| | | | | 1Ch |
| | | | | 20h |
| | | | | 24h |
| Cardbus CIS Pointer 940 | | | | 28h |
| Subsystem ID 944 | Subsystem Vendor ID 942 | | | 2Ch |
| Expansion ROM Base Address 946 | | | | 30h |
| Reserved 950 | | | Capabilities Pointer 948 | 34h |
| Reserved 952 | | | | 38h |
| Max_Lat 960 | Min_Gnt 958 | Interrupt Pin 956 | Interrupt Line 954 | 3Ch |

Configuration Space Header 900

FIG. 11

VIRTUALIZATION BRIDGE DEVICE

CROSS REFERENCE TO RELATED APPLICATIONS

This application claims the benefit of priority to U.S. Provisional Patent Application No. 60/888,984, entitled "Virtualization Bridge Device," filed Feb. 9, 2007, the entirety of which is incorporated herein by reference.

BACKGROUND OF THE INVENTION

1. Field of the Invention

This invention relates generally to the field of computer system architecture and more particularly, to an architecture that allows mapping between computing nodes and shared or non-shared I/O devices.

2. Description of the Related Art

Computing systems often contain multiple compute nodes. For example, computing systems may include multiple CPUs, one or more multi-core CPUs, CPUs that operate in multiple operating system domains, and/or multiple single-board computers configured as blades and mounted in a common chassis or drawer. In addition, compute nodes may be interfaced to multiple I/O devices. I/O devices may be any devices that allow data to be transferred to or from the compute nodes. For example, compute nodes may be coupled to one or more network interfaces such as Ethernet, storage area network interfaces such as Fibre Channel, graphics cards, USB or Firewire controllers, etc. In addition, redundant connections may also be desired to improve availability and reliability of the I/O interfaces. In modern computer systems, an interface subsystem placed between the compute nodes and the I/O devices may include a variety of chipsets connecting a host bus on the compute node side to one or more I/O buses on the other side, such as ISA, EISA, PCI, PCI-X, compact PCI, AGP, etc.

In order to make more effective use of the I/O devices in a system, the interface subsystem may be designed to permit compute nodes to share I/O devices. For instance, in a computer system that uses multiple blades to increase the available processing power, instead of placing I/O interface chipsets and I/O devices on each blade, each blade may interface to a set of shared I/O cards through a midplane that includes hardware to replace the function of the interface chipsets. The resulting architecture may provide a lower overall system cost, higher configuration flexibility, and more complete utilization of I/O devices. One skilled in the art will appreciate that a system of blades coupled to I/O devices through a midplane is but one example of an architecture in which I/O interface chipsets are separate from the compute nodes. What should be appreciated is that regardless of the type of compute nodes and I/O devices provided, some type of I/O interface permits the I/O devices to be shared. Further, the I/O interface may allow compute nodes to be designed, manufactured and sold separately from the I/O devices. Still further, the I/O interface may provide switching between compute nodes and I/O devices. Still further, the I/O interface may allow multiple compute nodes, operating independently and having one or more operating system domains, to share I/O devices as if the devices were dedicated to them.

In addition to the foregoing design considerations, efficient I/O interfaces are typically implemented in hardware or a combination of hardware and software. In the following descriptions, such I/O interfaces may be described as virtualization hardware, although it is understood that some functions of the I/O interface may comprise software and/or hardware. Virtualization hardware may typically include one or more switches to interconnect the compute nodes with the I/O devices. These switches combine together to create a virtual view of a switch fabric for each compute node. That virtual view may or may not correspond to the physical fabric layout.

One implementation of virtualization hardware uses the PCI Express (PCIe) protocol to interconnect compute nodes and I/O devices. In this implementation, the virtualization hardware presents a virtual view of a PCI Express system to each compute node. This virtual view contains virtual PCI Express switches for some or all of the physical PCI Express switches in the fabric. The virtual view also contains virtual I/O devices for some or all of the I/O devices in the fabric.

In a classic PCI Express (PCIe) I/O system there is one host processor (root) and several I/O devices. The root is associated with a single operating system and each I/O device is bound to that root. As processing power has increased, it has become possible to run multiple independent operating systems on a host processor. This introduces the problem of sharing an I/O device among multiple operating systems. Technology has also advanced in the I/O devices. I/O device bandwidth has evolved to where a single I/O device has more bandwidth than is needed by a single host processor. To be cost efficient it is advantageous to be able to share a single I/O device among multiple host processors, each of which may support multiple independent operating systems. The PCI Special Interest Group (PCI SIG) has defined two independent I/O virtualization standards to solve both of these problems:

SR-IOV—allows a single host processor supporting multiple operating systems to share a single I/O device.

MR-IOV—allows multiple host processors to share a single I/O device.

FIG. 1 illustrates a prior art embodiment of an SR-IOV system 100. In the illustrated embodiment, a single host processor 110, a PCIe switch 130, and SR PCIe endpoints 140, 150, and 160 are shown. PCIe switch 130 includes ports 131-134. Host processor 110 includes operating systems (OS) 115 and 116 that are managed by a hypervisor 114. Host processor 110 also includes a PCI root port 112, through which host processor 110 is coupled to switch port 131. Switch ports 132, 133, and 134 are coupled to SR PCIe endpoints 140, 150, and 160 respectively. From each OS's point of view, each endpoint is a dedicated resource to that OS. This allows existing software to be used without modification to communicate with the endpoints. In reality, however, multiple OS's are sharing the I/O device. Note a conventional PCIe switch may be used in an SR-IOV system. The endpoints have SR-IOV extensions to allow multiple OS's to share the endpoint resources.

FIG. 2 illustrates a prior art embodiment of an MR-IOV system 200. In the illustrated embodiment, single host processors 210 and 220, an MR PCIe switch 230, and MR PCIe endpoints 240, 250, and 260 are shown. PCIe switch 230 includes ports 231-235. Host processors 210 and 220 share the endpoints 240, 250, and 260. Each of host processors 210 and 220 may include one or more operating systems and a hypervisor (not shown). In addition host processor 210 includes a PCI root port 212 and host processor 220 includes a PCI root 222 through which to communicate with ports 231 and 232, respectively, of switch 230. Switch ports 233, 234, and 235 are coupled to MR PCIe endpoints 240, 250, and 260 respectively. Note both switch 230 and endpoints 240, 250, and 260 have MR-IOV extensions.

FIG. 3 illustrates one embodiment of an SR-IOV software system 300. In the illustrated embodiment a single host processor 310 hosts three OS's 320, 330 and 340 that share a single SR endpoint 360. Each of OS's 320, 330, and 340 includes a respective one of virtual function (VF) drivers 322, 332, and 342. A physical function (PF) driver 352 may run in a Hypervisor 350 that manages endpoint 360 and may provide services to the VF drivers. Note all the OS's are running in a single host processor that, in one embodiment, may be a symmetric multiprocessor using a variety of multi-core multi-chip or multi-thread techniques. Note that the PF driver 352 may also be located outside the Hypervisor 350, for example in a designated OS (such as OS 320). Such a designated OS may also contain a VF driver.

One problem is the endpoint extensions for SR-IOV and MR-IOV are different, so with current designs endpoint manufacturers have to generate two different products if they desire to satisfy both markets. The SR extensions have a lower implementation cost than the MR extensions. It would be desirable for endpoint manufacturers to only have to implement one set of extensions (preferably SR extensions because they have a lower cost) that could solve both the SR and MR system solutions. Accordingly, what is needed is a design that can enable an SR endpoint to function as an MR endpoint in an MR system. In addition, it is desirable that the design enables other types of endpoints to operate in MR-IOV systems.

SUMMARY OF THE INVENTION

Various embodiments of a computer system are disclosed. In one embodiment, a computer system includes a shared I/O device including at least first and second functions providing access to first and second portions of the device local memory space, respectively and a plurality of roots coupled to the shared I/O device via a switch fabric. A first root assigns a first address in a first root memory space to the first function. A second root assigns a second address in a second root memory space to the second function. The switch fabric maps the first root memory space to the first portion of device local memory space and the second root memory space to the second portion of device local memory space. Subsequently, the switch receives a first data transaction request from the first root targeted to the first address, translates the first address to a corresponding location in the first portion of the device local memory space based on the mapping, and handles the first data transaction request.

In a further embodiment, the switch fabric routes the data transaction request to the I/O device. In a still further embodiment, the first and the second addresses are the same. In a still further embodiment, at least one of the first and second functions is a virtual function.

In another embodiment, the first address comprises a root base address and an offset address. The switch fabric stores a value corresponding to a base address in the device local memory space in a base address register and replaces the root base address with the value stored in the base address register.

In another embodiment, the first data transaction includes a first identifier identifying the first root and a second data transaction includes a second identifier identifying the second root. The switch fabric replaces the first identifier with a third identifier, replaces the second identifier with a fourth identifier, and conveys the third identifier with the first data transaction request. The first identifier is the same as the second identifier and the third identifier is not the same as the fourth identifier. In a further embodiment, the switch fabric receives a response from the I/O device to the first data transaction request including the third identifier, translates the third identifier to the first identifier, and routes the response to the first root based on the third identifier.

In one embodiment, the I/O device is a PCIe endpoint configured to operate in a single root I/O virtualization environment. In another embodiment, the I/O device is a PCIe multi-function endpoint.

In a still further embodiment, the first root assigns a first range of addresses in the first root memory space to the first function. The switch maps the first root memory space to a memory range larger than the first portion of device local memory space, receives a third data transaction request from the first root targeted to a third address outside of a range of addresses that correspond to the first portion of device local memory space, and process the third data transaction request.

BRIEF DESCRIPTION OF THE DRAWINGS

FIG. 11 illustrates one embodiment of the layout of a PCI Express Type 0 VF Configuration Space Header.

Figure 1:
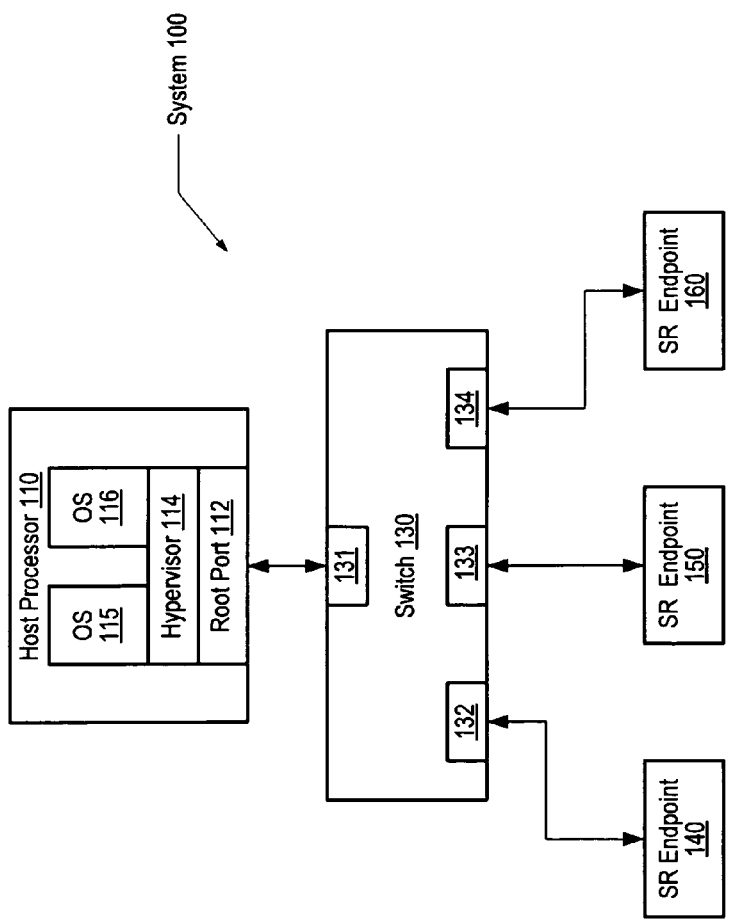
FIG. 1 illustrates a generalized block diagram of one embodiment of a prior art SR-IOV system.
Figure 2:
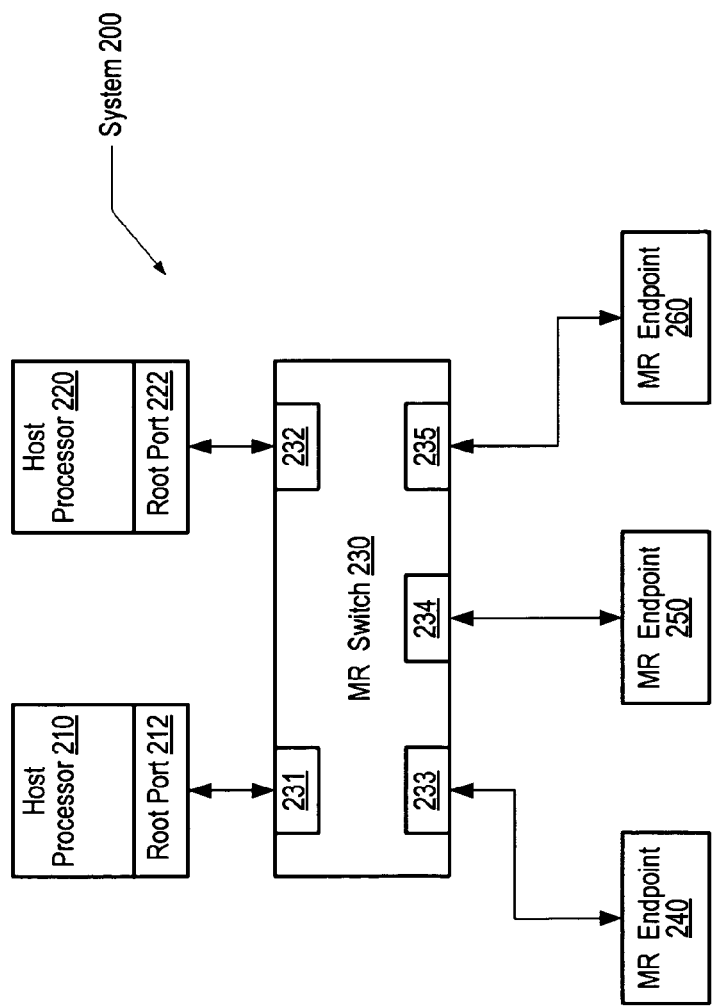
FIG. 2 illustrates a generalized block diagram of one embodiment of a prior art MR-IOV system.
Figure 3:
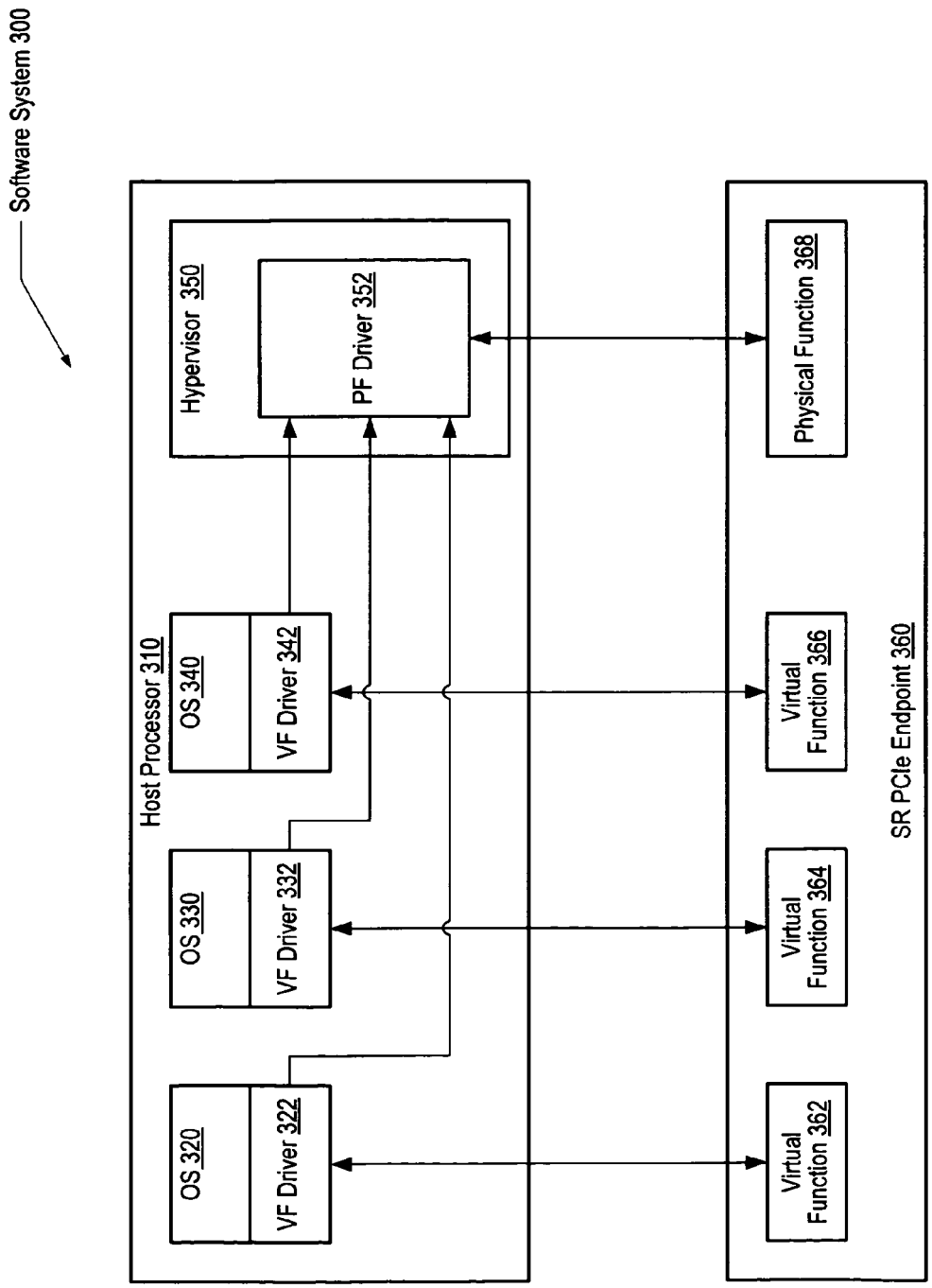
FIG. 3 illustrates one embodiment of a prior art SR-IOV software system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 5:
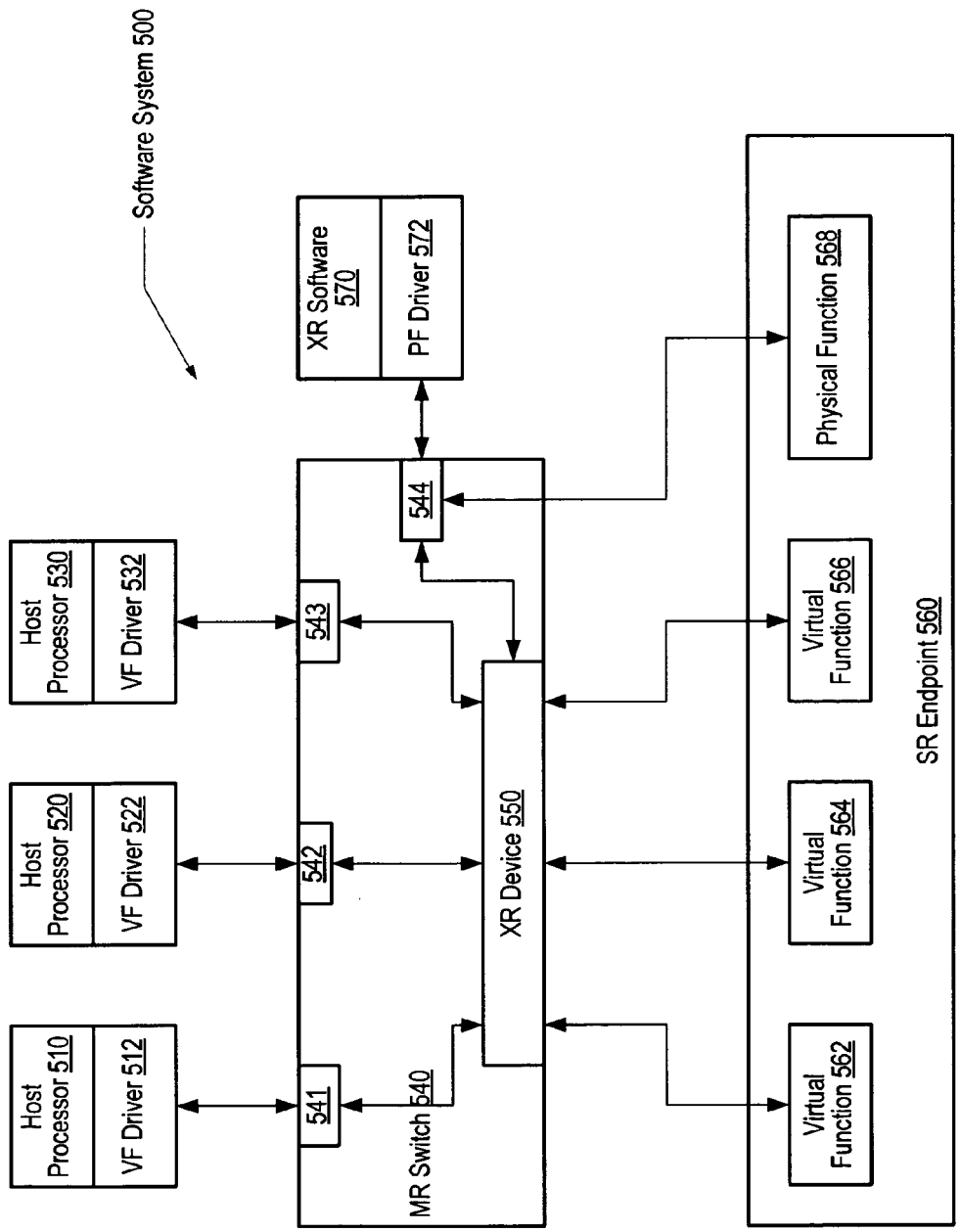
FIG. 5 illustrates one embodiment of an MR-IOV software system in which SR PCIe endpoints may be used.
Figure 6:
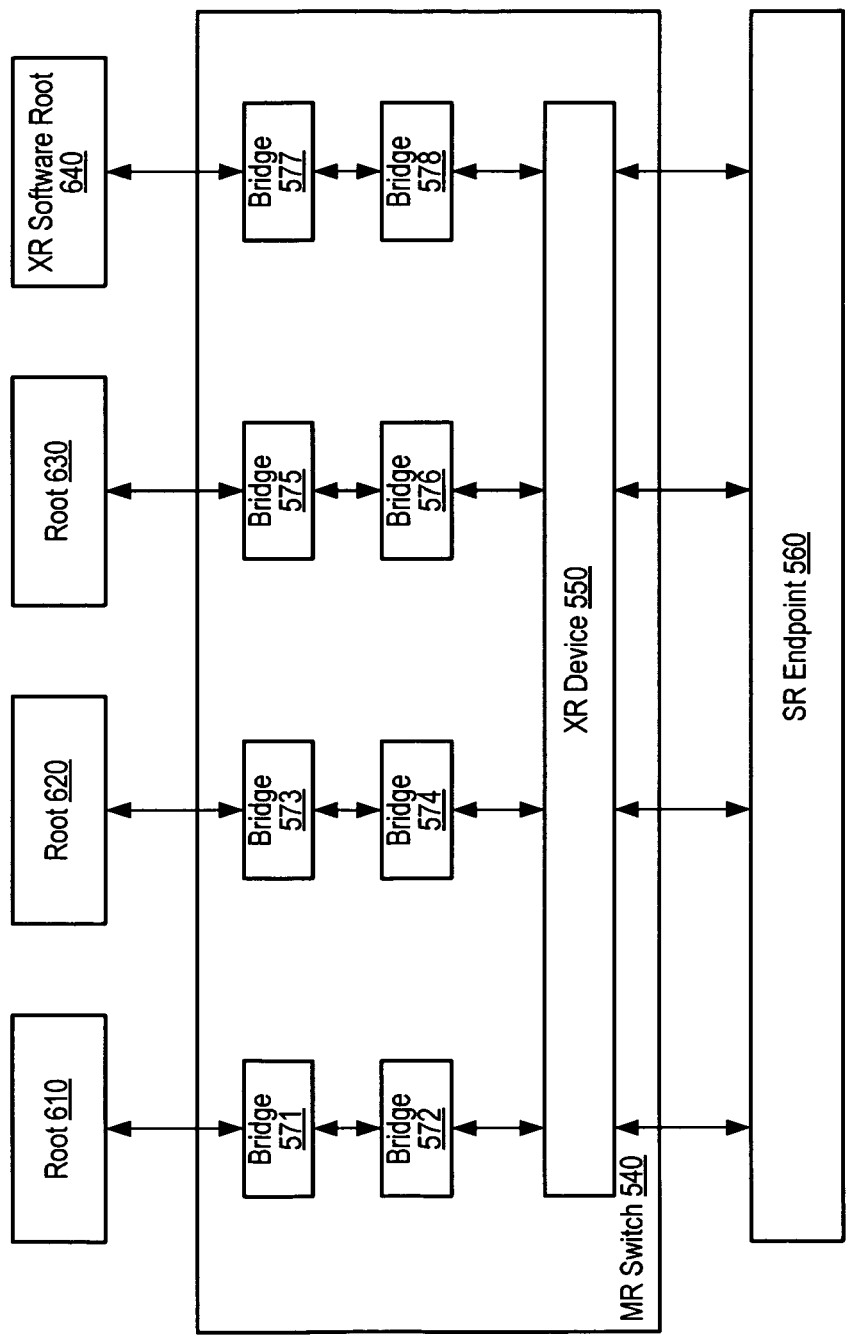
FIG. 6 illustrates one embodiment of MR PCIe switch that includes an embedded XR device.
Figure 7:
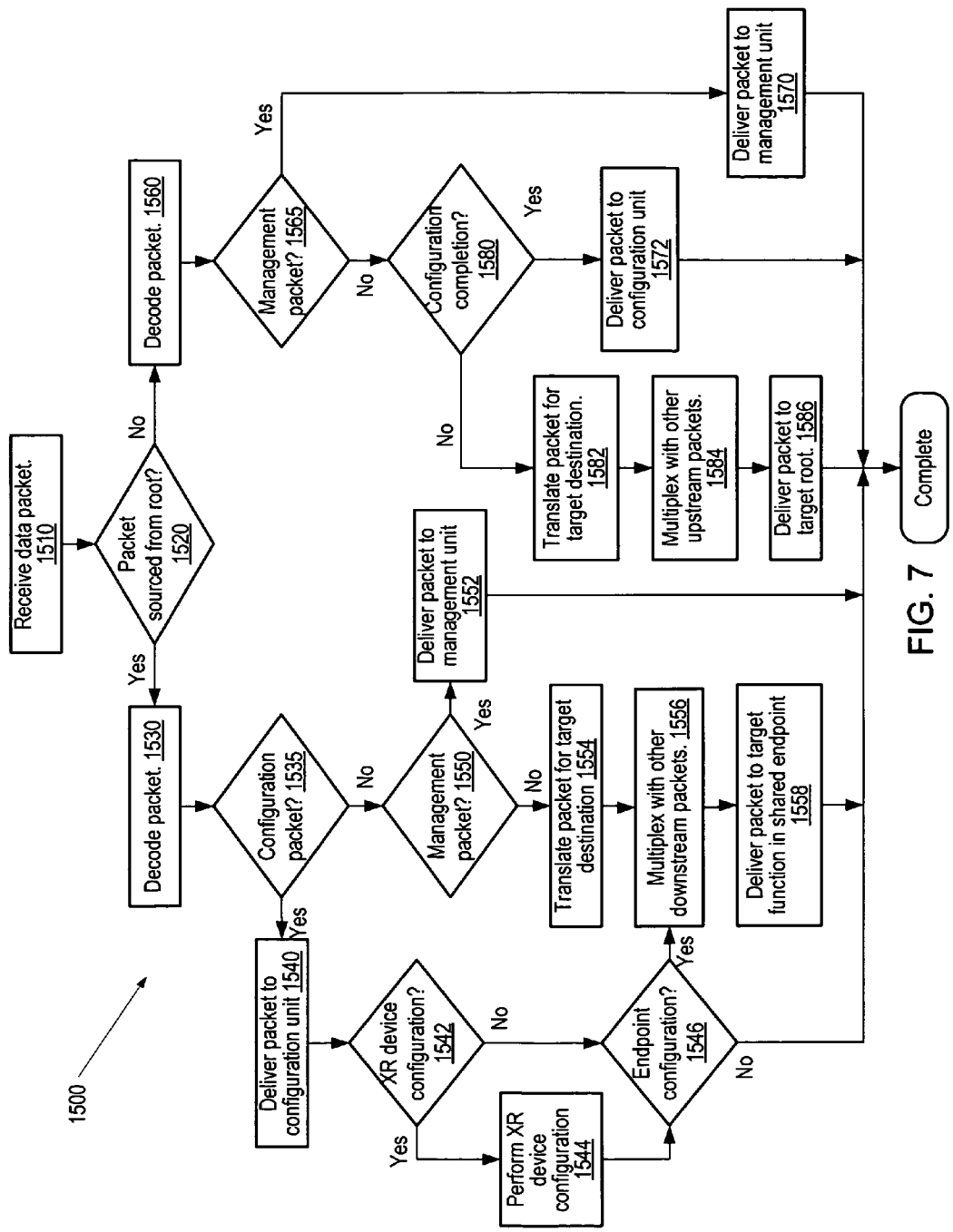
FIG. 7 illustrates one embodiment of a process that may be used by XR device to share an SR endpoint in an MR system

The following description is generally organized as follows. The first section includes FIG. 4 and provides an overview of one embodiment of an MR system in which SR endpoints may be used. FIG. 5 provides a software model of a system in which an SR endpoint is shared in an MR system. FIG. 6 illustrates a virtual model of an MR switch configured to share an SR endpoint. FIG. 7 illustrates the process by which an SR endpoint is shared in an MR system. FIGS. 8-14 illustrate various aspects of a device that may be used to implement the concepts shown in FIG. 7. Finally, FIGS. 15, 16, 17, and 18 illustrate various virtual hierarchies that may be implemented using the device.

System Overview

Figure 4:
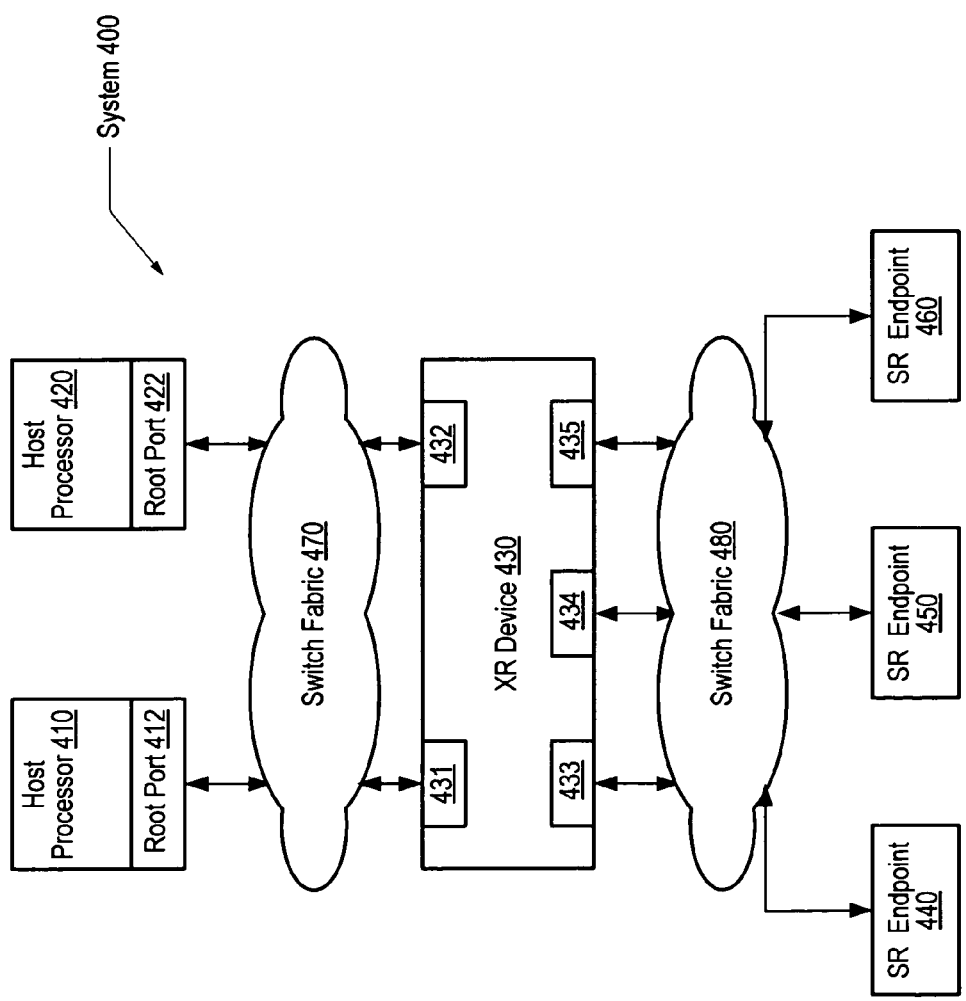
FIG. 4 illustrates a generalized block diagram of one embodiment of an MR-IOV computer system in which SR PCIe endpoints may be used.

FIG. 4 illustrates a generalized block diagram of one embodiment of an MR-IOV computer system 400 in which SR endpoints may be used. For convenience, system 400 and similar systems may be referred to hereinafter as XR systems. In the illustrated embodiment, single host processors 410 and 420, an XR device 430, switch fabrics 470 and 480, and SR endpoints 440, 450, and 460 are shown. In the following discussion, system components will be described in terms of a PCI express (PCIe) architecture. However, those skilled in the art will appreciate embodiments of the inventions described herein may find application in other system architectures. In the example of FIG. 4, XR device 430 includes ports 431-435, and host processors 410 and 420 share endpoints 440, 450, and 460. Each of host processors 410 and 420 may include one or more operating systems and a hypervisor (not shown). In addition, host processor 410 includes a PCI root port 412 and host processor 420 includes a PCI root port 422 for communication via switch fabric 470 and ports 431 and 432, respectively, of XR device 430. SR PCIe endpoints 440, 450, and 460 are coupled through switch fabric 480 to ports 433, 434, and 435, respectively.

Each of host processors 410 and 420 may be any of a variety of computing entities such as a CPU, one or more multi-core CPUs, a CPU that operates in multiple operating system domains, and/or a single-board computer configured as a blade and mounted in a common chassis or drawer with other blades. While a single connection is shown between each host processor and XR device 430, in alternative embodiments a host processor may include more than one point of connection that is commonly referred to as a root port. A root complex is typically a chip set that provides the interface between processing elements and memory and downstream I/O. Each root port of a root complex may have its own connection to XR device 430.

Each of SR PCIe endpoints 440, 450, and 460 is an I/O device that has SR-IOV capabilities, but does not have MR-IOV capabilities. Accordingly, endpoints 440, 450, and 460 may be I/O devices that are not configured to be shared by multiple roots. XR device 430 may comprise virtualization hardware or a combination of hardware and software. For example, XR device 430 may include a fabric of one or more PCI Express switches. In alternative embodiments, XR device 430 may include a fabric of switches, some of which may couple one or more non-shared endpoints to their respective root ports using conventional means, such as PCI Express components. In still further embodiments, any of root ports 412, 422, and endpoints 440, 450, and 460 may be coupled directly to XR device 430 rather than being coupled through additional switches or fabrics. A variety of topologies are possible and are contemplated.

Software Components

FIG. 5 illustrates one embodiment of an MR-IOV software system 500 in which SR PCIe endpoints may be used. In the illustrated embodiment, system 500 includes host processors 510, 520, and 530, an MR switch 540, SR PCIe endpoint 560, and XR software 570. Host processors 510, 520, and 530 each may run a single OS that collectively share SR endpoint 560 through MR switch 540. MR switch 540 may include ports 541-544 and an XR device 550. XR device 550 and XR software 570 together enable host processors 510, 520, and 530 to share SR PCIe endpoint 560 as if it were an MR PCIe endpoint. XR software 570 may include a PF driver 572. SR endpoint 560 may include virtual functions 562, 564, and 566 and physical function 568. XR device 550 enables host processors 510, 520, and 530 to be bound to virtual functions 562, 564, and 566. More particularly, the OS running on host processor 510 is associated with a VF driver 512 that is coupled to virtual function 562 via port 541 and XR device 550 of switch 540. The OS running on host processor 520 is associated with a VF driver 522 that is coupled to virtual function 564 via port 542 and XR device 550 of switch 540. The OS running on host processor 530 is associated with a VF driver 532 that is coupled to virtual function 566 via port 543 and XR device 550 of switch 540. PF driver 572 may be coupled to physical function 568 via port 544 of switch 540 through which it may provide services to VF drivers 512, 522, and 532. Note that although in the illustrated embodiment, XR device 550 is embedded in MR switch 540, in alternative embodiments XR device 550 may be a stand-alone entity. SR endpoint 560 maybe coupled to XR device 550 (and MR switch 540) through a single physical link that includes virtual connections to each of VF's 562, 564, and 566 and PF 568. The operation of XR device 550 will be described further below.

The several software components illustrated in FIG. 5 are the OS's, which may be used unmodified in an XR system; endpoint drivers, which may be used unmodified or with little change in an XR system; and XR software 570, which provides services to manage the PCIe switch with XR, as well as the XR functionality, manages the endpoint, and emulates hypervisor functionality that is required in an SR system. The functions of these software components are described further below.

In an SR system, each endpoint may have one or more drivers including one or more of a Physical Function driver and/or a Virtual Function driver. A Physical Function (PF) driver may manage/control a physical I/O device. Additionally, a PF driver may provide services to Virtual Function (VF) drivers. A VF driver may be used by a guest OS to communicate with an I/O device. In one embodiment of an XR system, XR software 570 may manage SR endpoint 560 using a PF driver for at least some of the management (i.e. a PF driver may run on the same entity that runs XR software 570).

In an XR system, an endpoint driver running on a root may be configured in a variety of ways. In one embodiment, a VF driver may be configured to communicate with a VF and leave global setup of the I/O device to a PF driver. In another embodiment, a non-virtual driver may run on a non-virtual aware OS (similar to an MR system). In this embodiment, the non-virtual driver may attempt to perform global setup on an endpoint device. XR device 550 may trap these operations and have them serviced by software. For example, operations that can be completed by the PF driver may be routed thereto; other operations may be emulated by XR software 570. In yet another embodiment, an XR driver, which may be considered a hybrid between the VF driver and the non-virtual driver, may be used. The XR driver may omit functionality that is the responsibility of the PF driver. The XR driver may also run on non-virtual aware OS's.

In one embodiment, XR software 570 supports an environment that allows a PF device driver to be utilized without significant changes. XR software 570 provides an API that mimics the API used by a PF device driver to interface with a standard operating system (e.g. Linux). This mechanism allows a PF device driver to be used with minimal changes, thus reducing the effort required to support a specific device.

In a traditional SR system, there is one hypervisor that manages the endpoint and may provide services to the guest OS's. As used herein, hypervisor refers to software that is responsible for managing the physical endpoint. In one embodiment of an XR system, there is no hypervisor running on the roots (i.e. there is no software that manages the physical I/O device on the roots). In such an embodiment, the hypervisor is emulated in XR hardware 550 and XR software 570. Some of the services provided by an SR hypervisor in an SR system may be provided by XR hardware/software in an XR system. These services, details of which are provided below, may include:

- PF to VF (primary to subordinate) driver communication
- Endpoint initialization
- Global setup/control of the endpoint
- Privileged operations (trap VH's access to privileged operations, and take appropriate action)
- Extra hypervisor services not related to the endpoints It is noted that in alternative embodiments, XR software 570 may run on a root that is also sharing an I/O device, such as one of the roots of host processors 510, 520, or 530.

MR Switch Model

FIG. 6 illustrates one embodiment of MR PCIe switch 540 that includes embedded XR device 550. Switch 540 couples roots 610, 620, 630, and 640 to an SR PCIe endpoint 560 by presenting endpoint 560 as a virtual device to roots 610, 620, 630, and 640 via pairs of virtual bridges. More particularly, each port of switch 540 may be modeled as a pair of virtual PCI-to-PCI bridges that are coupled through XR device 550 to endpoint 560. Bridges 571 and 572 couple root 610 to XR device 550. Bridges 573 and 574 couple root 620 to XR device 550. Bridges 575 and 576 couple root 630 to XR device 550. Bridges 577 and 578 couple XR software root 640 to XR device 550. XR device 550 implements functionality that is seen by roots 610, 620, 630, and 640 and serves as the translation agent between them and SR endpoint 560. In an alternative embodiment, SR PCIe endpoint 560 may be coupled to XR device 550 via a PCIe switch fabric, rather than being directly coupled to XR device 550.

XR Device Operational Overview

FIG. 7 illustrates one embodiment of a process 1500 that may be used by XR device 550 to share an SR endpoint in an MR system. Process 1500 begins with the reception of a data packet (block 1510). As used herein packet may refer to any of a variety of units of data. For example, in one embodiment, a packet may be a PCI Express Transaction Layer Packet (TLP). If the packet is sourced from a root (decision block 1520), i.e., if the packet is a downstream packet, it may be decoded (block 1530) and if it is a configuration packet (decision block 1535), delivered to a configuration unit (block 1540). If the packet includes configuration data that may be used within the XR device (decision block 1542), then the XR device-specific data may be used to configure portions of the XR device (block 1544). Alternatively, if there is no XR-specific data in the packet (decision block 1542) and there is no endpoint-specific data in the packet (decision bock 1546), packet processing is complete. If in decision block 1546 there is endpoint-specific data in the packet, the packet may be multiplexed with other downstream packets (block 1556) and conveyed to the endpoint (block 1558), completing packet processing.

Returning to decision block 1535, if the packet is not a configuration packet, but instead is a management packet (decision block 1550), the packet may be delivered to a management unit (block 1552), completing packet processing. If the packet is neither a configuration packet nor a management packet (decision blocks 1535 and 1550), the packet may be translated to determine the target destination (block 1554), multiplexed with other packets destined for an endpoint (block 1556), and delivered to the endpoint (block 1558), completing packet processing.

Returning to decision block 1520, if the packet is sourced from an endpoint, i.e., if the packet is an upstream packet, it may be decoded (block 1560) and if it is a management packet (decision block 1565), the packet may be delivered to a management unit (block 1570), completing packet processing. If the packet is not a management packet, but instead is a configuration completion packet (decision block 1580), the packet may be delivered to a configuration unit (block 1572), completing packet processing. If the packet is neither a configuration packet nor a management packet (decision blocks 1565 and 1580), the packet may be translated to determine the target destination (block 1582), multiplexed with other packets destined for a root (block 1584), and delivered to the root (block 1586), completing packet processing.

XR Device Components

Figure 8:
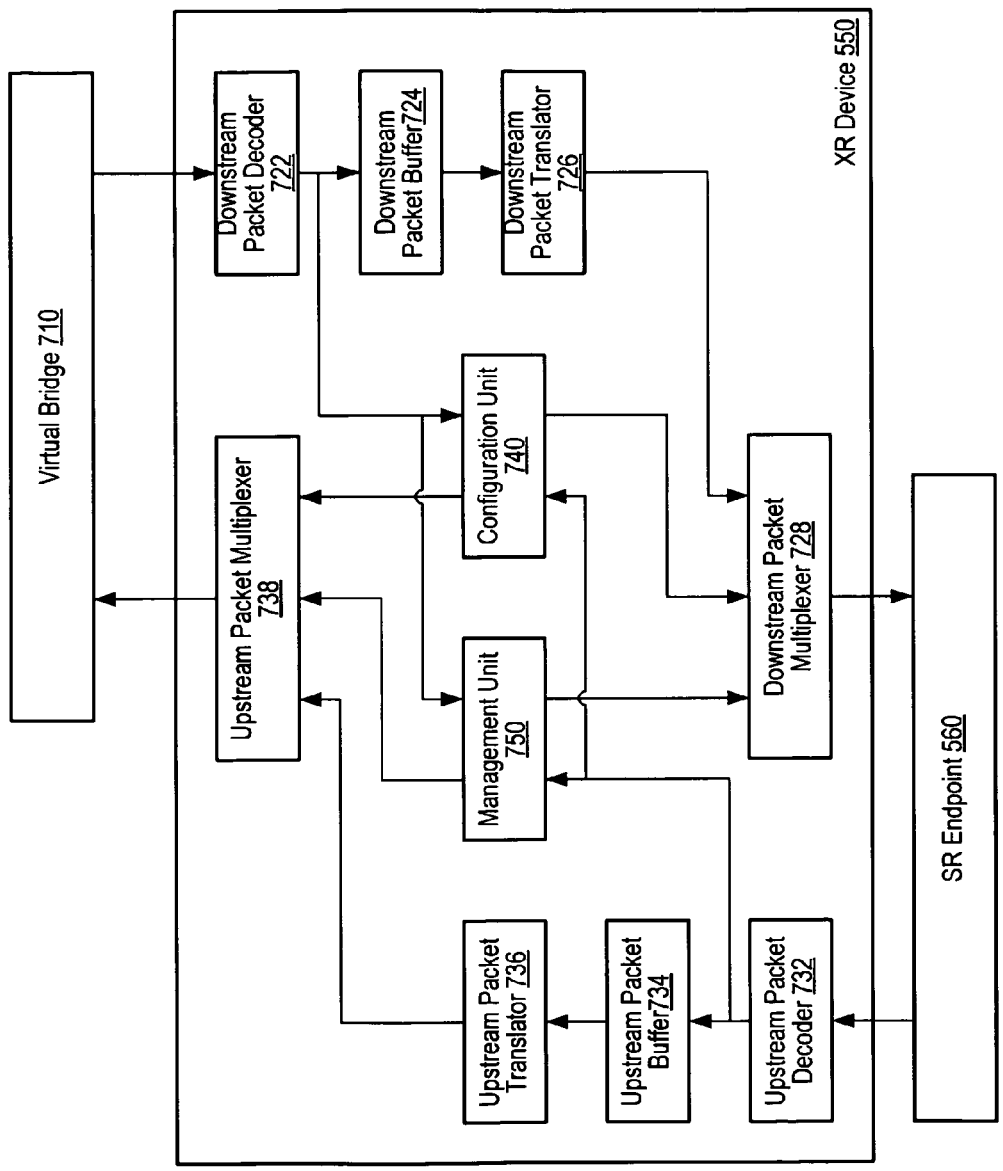
FIG. 8 is a block diagram of one embodiment of an XR device.

Turning now to FIG. 8, a block diagram of one embodiment of XR device 550 is shown. For purposes of discussion, a single virtual bridge 710 is shown coupled to SR PCIe endpoint 560 through XR device 550 in order to simply the description, although more than one virtual bridge may be coupled to the endpoint in other embodiments, as illustrated in FIG. 6. The packet processing principles of XR device 550 described below for the case of a single virtual bridge apply equally to cases in which multiple virtual bridges are coupled to the endpoint. XR device 550 may include a downstream packet decoder 722, a downstream packet buffer 724, a downstream translator 726, a downstream packet multiplexer 728, an upstream packet decoder 732, an upstream packet buffer 734, an upstream translator 736, an upstream packet multiplexer 738, a configuration unit 740, and a management unit 750. Generally speaking, data packets may be received by XR device 550 from either a root or from endpoint 560. Upstream and downstream packets may pass through similar functionality.

During operation, downstream packets (i.e., packets sourced from a root via virtual bridge 710) may be processed as follows. Downstream packet decoder 722 may receive and decode each packet and determine its destination. Configuration packets may be passed to configuration unit 740. Management packets may be passed to management unit 750. Other packets may be passed to downstream packet buffer 724 where packets that are destined for endpoint 560 may be temporarily placed in a queue. Packets queued in buffer 724 may be subsequently dequeued and further processed by downstream packet translator 726 where routing information such as address and requester ID that are specified in an MR domain may be translated to corresponding values in an SR domain. After translation, downstream packets may be routed to endpoint 560 through downstream packet multiplexer 728. Management and configuration packets may also be multiplexed and routed to endpoint 560 by downstream packet multiplexer 728. In one embodiment, downstream packet multiplexer 728 may also perform packet flow control.

During operation, upstream packets (i.e., packets sourced from endpoint 560) may be processed as follows. Upstream packet decoder 732 may receive and decode each packet and determine its destination. Configuration packets may be passed to configuration unit 740. For example, completion packets that correspond to packets that were sourced from configuration unit 740 may be routed to configuration unit 740. Management packets including, for example, interrupt packets and error message packets, may be passed to management unit 750. Other packets may be passed to upstream packet buffer 734 where packets that are destined for virtual bridge 710 may be temporarily placed in a queue. Packets queued in buffer 734 may be subsequently dequeued and further processed by upstream packet translator 736 where routing information such as address and requester ID that are specified in an SR domain may be translated to corresponding values in an MR domain. After translation, upstream packets may be routed to endpoint 560 through upstream packet multiplexer 738. Management and configuration packets may also be multiplexed and routed to endpoint 560 by upstream packet multiplexer 738. In one embodiment, upstream packet multiplexer 738 may also perform packet flow control and other management checking.

In addition to the functions described above, configuration unit 740 may handle all the configuration space translation and management to translate the SR configuration space in endpoint 560 to MR configuration space required by the switch/roots. Similarly, management unit 750 may also handle miscellaneous management of SR endpoint 560 and interfaces to XR software 570.

Address Translation

Figure 9:
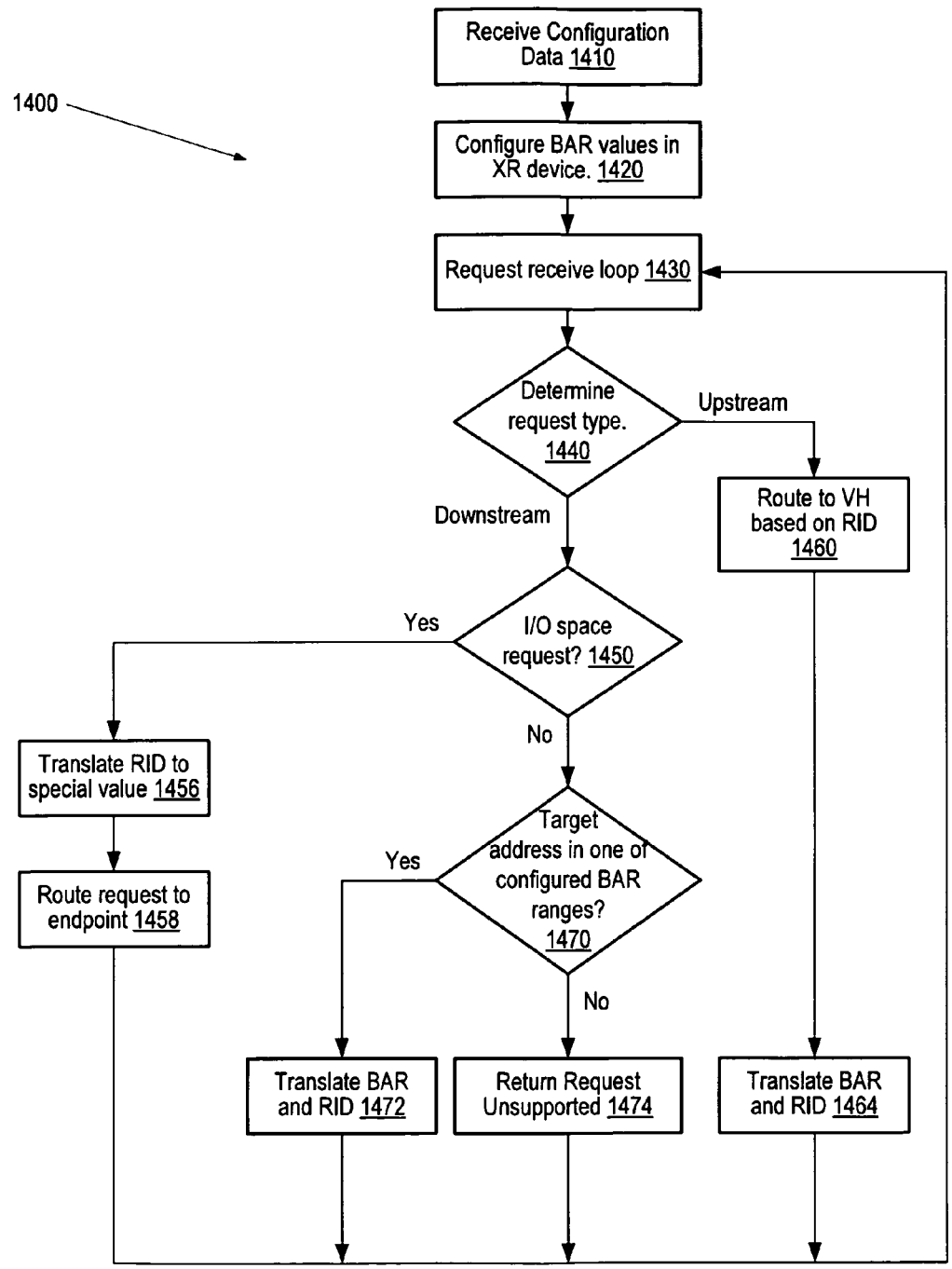
FIG. 9 illustrates one embodiment of a process that may be used by a translator in an XR device to translate packet addresses.

FIG. 9 illustrates one embodiment of a process 1400 that may be used by an XR device to translate packet addresses. Process 1400 may begin when configuration data is received from XR software (block 1410). The configuration data may, for example, be used to configure Base Address Register (BAR) values for use in packet address translation. For example, in one embodiment, a set of virtual BAR and VF BAR values may be established for each of the functions that are configured in the PCIe hierarchy. Subsequent to configuration, requests may be detected (block 1430). If the request is an upstream request (decision block 1440), the request may be routed to the originating VH that, in one embodiment, may be identified by the included RID. Once a VH is identified, the included BAR and RID in the request may be translated (block 1464). For example, in one embodiment, the RID and BAR may be translated to values that are specific to the originating VH. Once the BAR and RID have been translated, process 1400 may return to block 1430. If the request is a downstream request (decision block 1440) and if the request is also an I/O space request (decision block 1450), the included RID in the request may be translated. For example, in one embodiment, the included RID may be translated to a special RID value that may be used to identify a corresponding completion packet (block 1456). Once the RID has been translated, the request may be forwarded to the SR endpoint (block 1458) and process 1400 may return to block 1430.

If, at decision block 1450, a request that is not an I/O space request is received, in one embodiment the request may be assumed to be a memory space request. If the request includes a target address in one of the configured BAR address ranges (decision block 1470), then the included BAR and RID in the request may be translated (block 1472). For example, in one embodiment, the originating BAR may be translated to a virtual BAR that corresponds to VF BAR in the target VF using a formula such as the one described below in the description of FIG. 10. The included RID may be adjusted to correspond to the specific VH from which the request originated. Once the BAR and RID have been translated, process 1400 may return to block 1430. If the request is a downstream memory request and if the request includes a target address that is not in one of the configured BAR address ranges (decision block 1470), then an indication that the request is not supported may be returned (block 1474). For example, in one embodiment, the address in the request may be changed to one of a set of special values chosen so that they result in an unsupported request (UR) at the SR endpoint.

Software running in the Management VH of XR device 550 can see all of the PF's as well as all of the VF's within SR endpoint 560. Management VH software can also see and manipulate all registers within SR endpoint 560. In one embodiment, Management VH software may be configured not to issue DMA requests to VF's to avoid the DMA translation process described above. Requests within the Management VH are not translated by XR device 550. Programmed I/O transactions issued in the Management VH do not have their Requester IDs translated so that the resulting completions are routed back to the requester in the Management VH. In addition, XR device 550 may have a lockout mechanism that allows it to permit access from the Management VH and to block accesses from non-management VH's. This lockout mechanism disables all translation and guarantees that the Management VH has exclusive access to SR endpoint 560.

Figure 10:
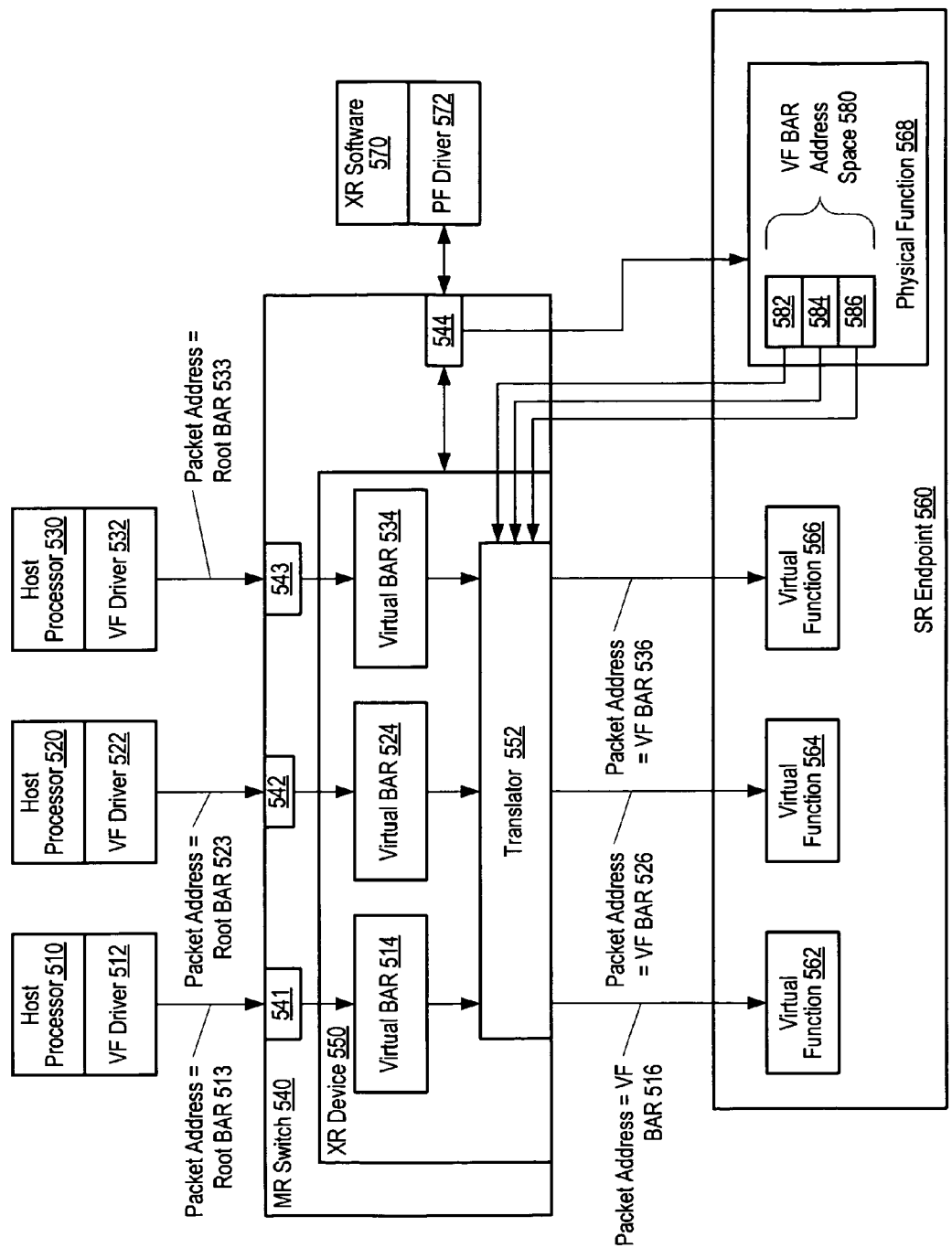
FIG. 10 illustrates one embodiment of a block diagram of the system illustrated in FIG. 5 that provides more detail of the components used in address translation.

FIG. 10 illustrates one embodiment of a block diagram of system 500 that provides more detail of the components used in address translation. The elements shown in FIG. 10 generally correspond to the elements shown in FIG. 5, wherein host processors 510, 520, and 530 collectively share SR endpoint 560 through MR switch 540. Each of host processors 510, 520, and 530 runs a single OS that has an independent view of the PCI hierarchy. Accordingly, each OS may independently assign an address space to endpoint 560 relative to its own base address register (BAR). More particularly, host processor 510 views the PCI hierarchy through an address space relative to a root BAR 513, host processor 520 views the PCI hierarchy through an address space relative to a root BAR 523, and host processor 530 views the PCI hierarchy through an address space relative to a root BAR 533. Corresponding virtual BARs 514, 524, and 534, respectively may be implemented in XR device 550. XR device 550 may base address translations on the virtual hierarchy of the received data packets. In one embodiment, the actual address space of a particular VF in endpoint 560 may be determined by XR software 570 in conjunction with PF driver 572. XR device 550 may translate addresses in root address space that correspond to a particular virtual BAR to a corresponding addresses in a device address space identified with a particular VF BAR to enable communication with the particular VF in endpoint 560. For Multi-Function non-SR devices, there may be physical BAR registers for each VF. In contrast, in an SR-IOV system, there may not be a physical VF base address register for each VF. Rather, VF BAR values may be computed by XR device 550. For example host processor 510 may communicate with VF 562. Host processor 510 addresses packets to an address that corresponds with virtual BAR 514. XR device 550 receives packets from host processor 510 and uses a translator 552 to translate addresses relative to virtual BAR 514 to addresses relative to VF BAR 516. The operation of translator 552 is described in further detail below. Addresses relative to VF BAR 516 correspond to physical addresses 586 within VF BAR address space 580 of physical function 568. Similarly, host processor 520 communicates with VF 564. Host processor 520 addresses packets to an address that corresponds with virtual BAR 524. XR device 550 receives packets from host processor 520 and uses translator 552 to translate addresses relative to virtual BAR 524 to addresses relative to VF BAR 526. Addresses relative to VF BAR 526 correspond to physical addresses 584 within VF BAR address space 580 of physical function 568. Host processor 530 communicates with VF 566 in a similar manner.

During configuration, XR software 570 may configure virtual BAR sizes to match the VF sizes (as well as window size and addressing style, i.e., whether addresses are expressed in 32 bit or 64 bit windows). Alternatively, each virtual BAR in the XR device may also be programmed as a 32-bit Memory BAR, a 64-bit Memory BAR, or an I/O BAR. Virtual BARS may also be configured to a size that is larger than the VF size, providing additional address space that may be used for certain transactions. In this case, XR device 550 may detect transactions targeted to addresses outside the range of the VF BAR and route them to XR software 570 for emulation. In one embodiment, the additional address space may be used for passing messages between drivers and endpoints. For multifunction endpoints that support I/O space, XR software 570 may similarly configure the virtual BAR sizes and addressing style to support I/O space and to match the underlying function size. During a downstream transaction, memory requests including a target address and a requestor ID (RID) are passed through XR device 550 where translator 552 translates the target address and RID. For example, a memory space transaction may be targeted to one of the memory regions claimed by one of the virtual BARs or an I/O space transactions may be targeted to one of the I/O regions claimed by one of the virtual BARs. Requests that are targeted to a virtual BAR are converted to addresses within the corresponding VF. For example, in one embodiment, the following arithmetic function may be used for address conversion:

$$VF\_addr = XR\_addr - Virtual\_BAR\_value + Endpoint\_BAR\_value + XR\_BAR\_size * XR\_Instance\_index$$

Where:
- XR_addr is the address in the request packet
- VF_addr is the address in the translated version of the packet.
- Virtual_BAR_value is the value written by VH software to the virtual BAR
- Endpoint_BAR_value is written by XR software and is a copy of the value written to the VF BAR in the Endpoint
- XR_BAR_size is written by XR software and is the size BAR offered by XR. This also matches the VF BAR value in the Endpoint
- XR_Instance_index is a constant determined by which instance of XR is being addressed by this transaction In one embodiment, requests that are not targeted to a virtual BAR in XR device 550 return an unsupported request (UR) code. For example, the address in the request may be changed to one of a set of special values configured by XR software 570. These special values are chosen so that they result in a "UR" at the SR endpoint. There may be a first special memory address used for 32-bit transactions and a second special value used for 64-it transaction. In addition, all I/O transactions may be converted into a pre-programmed I/O "UR" address.

A similar translation may be performed for upstream packets except that translator 552 may base the translation on the RID of the packet that has been adjusted to correspond to a specific VH. This allows the associated completions to be routed back to the correct VH and also guarantees that transaction IDs remain unique (the same tag value could be simultaneously outstanding in distinct VH's). For a Non-Posted request, the Completer ID in the associated completion packet may be similarly translated. The XR-specific instance value contained in the Completer ID may be used to determine which VH should get the completion and to determine the translated Completer ID. Similar rules may be applied to vendor-defined messages that are routed by address.

In a further embodiment, XR device 550 offers an I/O space emulation facility. Even if an SR endpoint does not support I/O space, XR device 550 may offer I/O space to support booting and similar operations. An I/O BAR can be configured to trap to XR software. A hit to such a BAR causes the request packet to be captured and an interrupt generated to management software within XR software 570. The I/O request may also be forwarded to the SR endpoint (to preserve ordering rules, etc.) but with a RID set to a special value. When the completion comes back from the SR endpoint, it is dropped. The management software may then emulate the I/O operation and generate the associated completion packet.

XR Configuration Space Header

Turning now to FIG. 11, one embodiment of a PCI Express Type 0 Configuration Space Header 900 is shown. Configuration space header 900 is a data structure through which a root may identify and control an I/O device. In the illustrated embodiment, configuration space header 900 includes several registers that are described in detail below: vendor ID 910, device ID 912, command register 914, status register 916, revision ID 918, class code 920, cache line size 922, master latency timer 924, header type 926, built-in self test (BIST) register 928, base address registers 930, cardbus CIS pointer 940, subsystem vendor ID 942, subsystem ID 944, expansion ROM base address 946, capabilities pointer 948, reserved registers 950 and 952, interrupt line 954, interrupt pin 956, and latency timer values min_gnt 958, and max-lat 960.

In one embodiment, configuration space headers may be stored in an address space within a configuration block of an XR device (for example, configuration unit 740 of FIG. 8). Further, in one embodiment, non-XR specific functionality in header 900 conforms to a draft of the SR-IOV specification (revision 0.7, Jan. 11, 2007). Access to a portion of a configuration space header may be achieved via a communication mechanism referred to as a configuration cycle. Generally speaking, a configuration cycle may be sent to the endpoint if any bit of a register that is being accessed is implemented in the endpoint in order to preserve ordering. For configuration registers that are completely implemented in XR hardware, a "dummy" read or write configuration cycle may be generated to a register that has no side effects (i.e. Vendor ID registers), and the completion may not be returned from XR device 550 until the completion is returned from SR endpoint 560. If a register requires no action from XR device 550, XR device 550 need not shadow that register (see, for example, the Class Code register below). If nothing is written for a configuration register, XR device 550 may pass the information in the configuration cycle to the SR-endpoint unchanged, and completions may be passed from the SR-endpoint to the root unchanged. The following sections describe the bit fields that may be found in one embodiment of a configuration space packet header and how they are handled by an XR device and/or XR software.

Table 1 below describes attributes of the fields found in one embodiment of the configuration space header 900 shown in FIG. 11. Included in the table are references to the PCI Local Bus Specification 3.0, PCI Express Base Specification, Revision 1.1, and PCI Express Base Specification, Revision 2.0, all three of which are incorporated herein by reference in their entirety.

TABLE 1

Configuration Space Header Register Attributes

| Register Attribute | Description |
|---|---|
| LB 3.0 | Attribute is the same as specified in PCI Local Bus Specification 3.0. |
| Base 1.1 | Attribute is the same as specified in PCI Express Base Specification, Revision 1.1 |
| Base 2.0 | Attribute is the same as specified in PCI Express Base Specification, Revision 2.0. |
| HwInit | Hardware Initialized: Register bits are initialized by firmware or hardware mechanisms such as pin strapping or serial EEPROM. Bits are read-only after initialization and can only be reset (for write-once by firmware) with "Power Good Reset." |
| RO | Read-only register: Register bits are read-only and cannot be altered by software. Register bits may be initialized by hardware mechanisms such as pin strapping or serial EEPROM. |
| RW | Read-Write register: Register bits are read-write and may be either set or cleared by software to the desired state. |
| RW1C | Read-only status, Write-1-to-clear status register: Register bits indicate status when read, a set bit indicating a status event may be cleared by writing a 1. Writing a 0 to RW1C bits has no effect. |
| ROS | Sticky - Read-only register: Registers are read-only and cannot be altered by software. Registers are not initialized or modified by reset. Devices that consume AUX power must preserve sticky register values when AUX power consumption (either via AUX power or PME Enable) is enabled. |
| RWS | Sticky - Read-Write register: Registers are read-write and may be either set or cleared by software to the desired state. Bits are not initialized or modified by reset. Devices that consume AUX power must preserve sticky register values when AUX power consumption (either via AUX power or PME Enable) is enabled. |
| RW1CS | Sticky - Read-only status, Write-1-to-clear status register: Registers indicate status when read, a set bit indicating a status event may be cleared b y writing a 1. Writing a 0 to RW1CS bits has no effect. Bits are not initialized or modified by reset. Devices that consume AUX power must preserve sticky register values when AUX power consumption (either via AUX power or PME Enable) is enabled. |
| RsvdP | Reserved and Preserved: Reserved for future RW implementations; software must preserve value read for writes to bits. |
| RsvdZ | Reserved and Zero: Reserved for future RW1C implementations ;software must use 0 for writes to bits. |

In one embodiment, any bit that XR device 550 emulates will behave as described in the PCI Express 2.0 spec with respect to the guest OS. For example a R/W bit in the Type 0 space will still be R/W in XR hardware/software even if it is RO in the VF. In one embodiment, the following categories of registers are included:

- Endpoint only (E)—These are implemented in the Endpoint. XR hardware does not do anything with these bits. Read data is returned from the Endpoint, and writes pass through to the endpoint un-modified. Depending on the register, XR hardware may pass the request through to the VF or the PF instance of the register.
- XR only (X)—These are emulated completely in XR hardware. Read data is returned from XR hardware, and writes update XR registers.
- Shared XR/Endpoint (S)—These are implemented by both the endpoint and XR hardware. Reads go to the endpoint, and the read data from the endpoint is merged with data in XR hardware. Writes update the register in the endpoint and XR hardware.

Register Fields in Configuration Space Header

A detailed description of the bit fields of the registers in one embodiment of configuration space header 900 is presented below.

Vendor ID register 910 (offset 00h); XR_Attr:E may be a read-only field identifying the manufacturer of the PCIe device. The field in the PF and associated VF's return the same value when read. This field may be implemented by XR device 550.

Device ID register 912 (offset 02h); XR_Attr:E may be a read-only field identifying the particular PCIe device. The PCIe device may report a different value in the PF and the VF; however all VF's associated with a given PF report the same value. This field may be implemented by XR device 550

Command register 914 (offset 04h). Table 2 below establishes the mapping between PCI Express Base 2.0 and PF/VF definitions in this document for one embodiment of configuration space command register 914.

TABLE 2

Command Register 914 Definitions

| Bit Location | PF and VF Register Differences from Base 2.0 | PF Attributes | VF Attributes | XR Attributes |
|---|---|---|---|---|
| 0 | I/O Space Enable - In one embodiment, may be hardwired to 0b for VF's. This bit may be implemented in XR device 550. XR device 550 may trap all I/O cycles to the endpoint and pass them to XR software 570. XR software 570 may include endpoint aware software that services the I/O cycles (i.e. converts the I/O cycles to equivalent memory mapped I/O cycles). This functionality may be provided to support devices that require | Base 1.1 | RO | X |

TABLE 2-continued

Command Register 914 Definitions

| Bit Location | PF and VF Register Differences from Base 2.0 | PF Attributes | VF Attributes | XR Attributes |
|---|---|---|---|---|
| | hypervisor I/O space emulation due to legacy boot time requirements. | | | |
| 1 | Memory Space Enable - In one embodiment, may be hardwired to 0b for VF's. VF Memory Space may be controlled by the VF MSE bit in the VF control register. This bit may be implemented in XR device 550. If memory space is not enabled by the root, XR device 550 may respond as a PCIe device would for all memory packets targeting the VF (i.e. by reporting that the request is an Unsupported Request (UR)). | Base 1.1 | RO | X |
| 2 | Bus Master Enable - Disabling this bit may prevent the associated PF or VF from issuing any Memory or I/O Requests. Note that as MSI/MSI-X interrupt messages are in-band memory writes, disabling the bus master enable bit disables MSI/MSI-X interrupt messages as well. Requests other than Memory or I/O requests are not controlled by this bit. The default value of this field is 0b. This bit may be hardwired to 0b if a device does not generate Memory or I/O Requests. Note: The state of active transactions is not specified when this bit is disabled after being enabled. The PCIe device can choose how it behaves when this condition occurs. Software cannot count on the PCIe device retaining state and resuming without loss of data when the bit is re-enabled. Transactions for a VF that has its Bus Master Enable set must not be blocked by transactions for VF's that have their Bus Master Enable cleared. Bus Master Enable is implemented in the endpoint. Therefore, in this embodiment, XR device 550 does nothing with this bit. In alternative embodiments, XR device 550 may generate Memory or I/O requests, shadow this bit, and gate generation of requests (i.e. MS I). | Base 1.1 | Base 1.1 | E |
| 3 | Special Cycle Enable - In one embodiment, may be hardwired to 0b | Base 1.1 | Base 1.1 | E |
| 4 | Memory Write and Invalidate - In one embodiment, may be hardwired to 0b | Base 1.1 | Base 1.1 | E |
| 5 | VGA Palette Snoop - In one embodiment, may be hardwired to 0b | Base 1.1 | Base 1.1 | E |
| 6 | Parity Error Enable - In one embodiment, may be hardwired to 0b for VF's. Error reporting is described in further detail below. | Base 1.1 | RO | X |
| 7 | IDSEL Stepping/Wait Cycle Control - In one embodiment, may be hardwired to 0b | Base 1.1 | Base 1.1 | E |
| 8 | SERR Enable - In one embodiment, may be hardwired to 0b for VF's. Error reporting is described in further detail below. XR device 550 may implement the SERR enable bit as a R/W. In Base enables generation of ERR_NONFATAL/ERR_FATAL. If XR device 550 (VF) bit is not set and the PCI-E capability error message enable is not set, XR device 550 will discard error messages from the endpoint. | Base 1.1 | RO | X |
| 9 | Fast Back-to-Back Transactions Enable - In one embodiment, may be hardwired to 0b | Base 1.1 | Base 1.1 | E |
| 10 | Interrupt Disable - In one embodiment, may be hardwired to 0b for VF's. If INTx emulation is enabled, then this bit gates INTx message generation per VH (VF) in XR device 550. Hardware or software may clear the 'MSI enable' bit in the endpoint when this bit changes. Changing this bit may cause an INTx assert/de-assert. | Base 1.1 | RO | X |

Status register 916 (offset 06h). Table 3 below establishes the mapping between PCI Express Base 1.1 and PF/VF definitions for one embodiment of configuration space status register 916.

TABLE 3

Status Register 916

| Bit Location | PF and VF Register Differences from Base 1.1 | PF Attributes | VF Attributes | XR Attributes |
|---|---|---|---|---|
| 3 | Interrupt Status - In one embodiment, may be hardwired to 0b for VF's. XR device 550 may emulate this bit if INTx emulation is enabled. | Base 1.1 | RO | X |
| 4 | Capabilities List - In one embodiment, may be hardwired to 1 for PF's and VF's. | Base 1.1 | Base 1.1 | E |
| 5 | 66 MHz Capable - In one embodiment, may be hardwired to 0b | Base 1.1 | Base 1.1 | E |
| 7 | Fast Back-to-Back Transactions Capable - In one embodiment, may be hardwired to 0b | Base 1.1 | Base 1.1 | E |
| 8 | Master Data Parity Error - See Tablet. Command register 914 Definitionsfor details. XR device 550 may emulate this bit. More particularly, XR device 550 may snoop packets and set the Master Data Parity Error bit if a Parity Error Response bit is set and a poisoned Completion or a poisoned Write from the endpoint is detected. | Base 1.1 | Base 1.1 | X |
| 10:9 | DEVSEL Timing - In one embodiment, may be hardwired to 0b. | Base 1.1 | Base 1.1 | E |
| 11 | Signaled Target Abort - XR device 550 may set this bit when an endpoint sends a completion with the completer abort status. The endpoint may send a completion with completer abort status if the programming model is violated (this is optional). XR device 550 may not generate a completion with completer abort status. XR device 550 may check if the address is correct (in the range of the BAR). If it is not in the BAR range, XR device 550 may return unsupported request status rather than completer abort status. | Base 1.1 | Base 1.1 | X |
| 12 | Received Target Abort - In one embodiment, this bit may be implemented in SR endpoint 560 and set when a requester receives a completion with Completer Abort status. | Base 1.1 | Base 1.1 | E |
| 13 | Received Master Abort - In one embodiment, this bit may be implemented in SR endpoint 560 and set when a requester receives a completion with Unsupported Request (UR) status. | Base 1.1 | Base 1.1 | E |
| 14 | Signaled System Error - XR device 550 may emulate this bit, setting the bit when it sends ERR_FATAL/ERR_NONFATAL and the SERR#Enable bit is set. XR device 550 may also set this bit under other conditions that would cause it to generate an ERR message. | Base 1.1 | Base 1.1 | X |
| 15 | Detected Parity Error - XR device 550 may snoop received packets and set this bit if a poisoned packet is received. | Base 1.1 | Base 1.1 | X |

Revision ID register 918 (offset 08h); XR_Attr:X may specify a device specific revision identifier. This field may be viewed as a vendor defined extension to the Device ID and may follow the same rules regarding PF's and VF's. The value reported in the VF may be different than the value reported in the PF; however, in one embodiment, all VF's associated with a given PF report the same value. In a further embodiment, XR device 550 may implement a separate Revision ID register 918 for each VF.

Class Code 920 (offset 09h); XR_Attr:X may be a read-only register used to identify the generic function of a device and, in some cases, a specific register level programming interface. The fields in the PF and associated VF's return the same value when read. In one embodiment, XR device 550 may implement a separate Class Code 920 register for each VF.

Cache Line Size register 922 (offset 0Ch); XR_Attr:X may be implemented by PCI Express devices as a read-write field for legacy compatibility purposes. In one embodiment, it has no effect on any PCI Express device behavior. Physical Functions may continue to implement this field as RW. For Virtual Functions this field may be RO and may be hardwired to 00h. In one embodiment, XR device 550 may implement a separate Cache Line Size register 922 register for each VF.

Master Latency Timer register 924 (offset 0Dh); XR_Attr:E may not apply to PCI Express. In one embodiment, this register may be hardwired to 00h.

Header Type 926 (offset 0Eh); XR_Attr:X. This byte may identify the layout of the second part of the predefined header (beginning at byte 10*h* in Configuration Space) and also whether or not the device contains multiple Functions. Bit 7 in this register may be used to identify a multi-function device. For an SR-IOV device, bit 7 may be set if there are multiple PF's or Functions. VF's may not affect the value of bit 7. Bits 6 through 0 identify the layout of the second part of the predefined header. For VF's, this field may be 00h. XR device 550 may return a value for header type 926 indicating whether or not each virtual OS gets multiple functions. This may be required if an endpoint includes multiple PF's so that there may be more than one PF function per VH.

BIST 928 (offset 0Fh); XR_Attr:E. This register (optional in PCI Express) may be used for control and status of built-in self test (BIST). In one embodiment, PCIe devices that do not support BIST return a value of 0 (i.e., treat it as a reserved register). In a further embodiment, VF's do not support BIST and define this field as RO '0'. Note, in the IOV enabled environment, a virtualization intermediary (VI) may block the initiation of BIST. For example, a VI may block the initiation of BIST because IOV is enabled for the PF, or because running BIST for the function may affect other function operations on the same device. If the VI is going to block the initiation of BIST, then the VI may also intervene in the reading of the BIST field and indicate to the reader of the BIST field that BIST is not implemented for the function, even if it actually is implemented in the device. Software may read the BIST field each time before writing the BIST field, to make sure that it is actually available. Software that uses BIST to initialize a function may use Function Level Reset (FLR), when FLR is implemented for the function, and when FLR provides the same level of functionality. Software may not run BIST on a PF when the associated VF Enable is Set. In PCIe devices that support BIST, one PF running BIST may not affect other PF's. In one embodiment, XR software 570 may be configured to support BIST.

Base Address registers 930 (offset 10h, 14h, . . . 24h); XR_Attr: X. For VF's, the values in these registers may be Read Only '0'. XR device 550 may emulate the BARs and provide the read/write BAR registers to the roots. XR software 570 may setup the BARs in the endpoint and configure XR device 550 so that the endpoint BAR values are know in XR device 550. XR device 550 may translate addresses from the VH/BAR in XR device 550 to the VF/BAR in SR endpoint 560 (this translation may be performed by downstream packet translator 726. The endpoint may use a stride mechanism to translate VF BARs as described further below.

Cardbus CIS Pointer 940 (offset 28h); XR_Attr:E. For VF's, this register may not be used and may return '0'.

Subsystem Vendor ID 942 (offset 2Ch); XR_Attr:E may be a read-only field that identifies the manufacturer of the subsystem. In one embodiment, the field in the PF and associated VF's return the same value when read. XR device 550 may return a value configured by XR software 570 for this field.

Subsystem Device ID 944 (offset 2Eh); XR_Attr:E may be a read-only field that identifies the particular subsystem. In one embodiment, this field may have a different value in the PF and the VF of a PCIe device; however all VF's associated with a given PF have the same value. XR device 550 may return a value configured by XR software 570 for this field.

Expansion ROM Base Address register 946 (offset 30h); XR_Attr:X may be implemented in PF's. The expansion ROM BAR may be read-only in VF's. XR device 550 may emulate a ROM BAR. XR device 550 may discover whether an SR endpoint implements a PF only ROM BAR, or independent VF ROM BARs. If PF only, XR device 550 may translate accesses corresponding to VH ROM BARs into accesses corresponding to the PF ROM BAR. If independent VF ROM BARs, then XR device 550 may translate accesses corresponding to the VH/ROM_BARs into accesses corresponding to the VF/ROM_BARs in the endpoint (this translation may be performed in downstream packet translator 726).

Capabilities Pointer 948 (offset 34h); XR_Attr:E may be implemented as described in the PCIe specification.

Interrupt Line register 954 (offset 3Ch); XR_Attr:X. In one embodiment, this field does not apply to VF's and may be hardwired to 0. XR device 550 may emulate this field as a R/W register.

Interrupt Pin register 956 (offset 3Dh); XR_Attr:X. In one embodiment, this field does not apply to VF's and may be hardwired to 0. XR device 550 may emulate this field and, for example, tie the value to a logical '1' (INTA). In alternative embodiments, XR device 550 may tie the value to a logical '0' if INTx emulation is not enabled.

Min_Gnt register 958/Max_Lat register 960 (offset 3Eh/3Fh); XR_Attr:E. In one embodiment, these registers do not apply to PCI Express. They may be RO and hardwired to '0'.

Individual fields of the Type0 configuration space defined in the above configuration space header 900 may be set by XR device 550 or programmable by XR software 570. For example, Device ID, Vendor ID, and/or Subsystem Vendor ID may be set in XR device 550 or in XR software 570. In one embodiment, XR device 550 may emulate a type 0 configuration space. In this case, VendorID and DeviceID may be programmable—allowing the appropriate driver(s) to be loaded and permitting the PF and VF to have different DeviceIDs as well as allowing the XR device 550 emulated VF to present the PF DeviceID.

PCI Express Capabilities Structure

Figure 12:
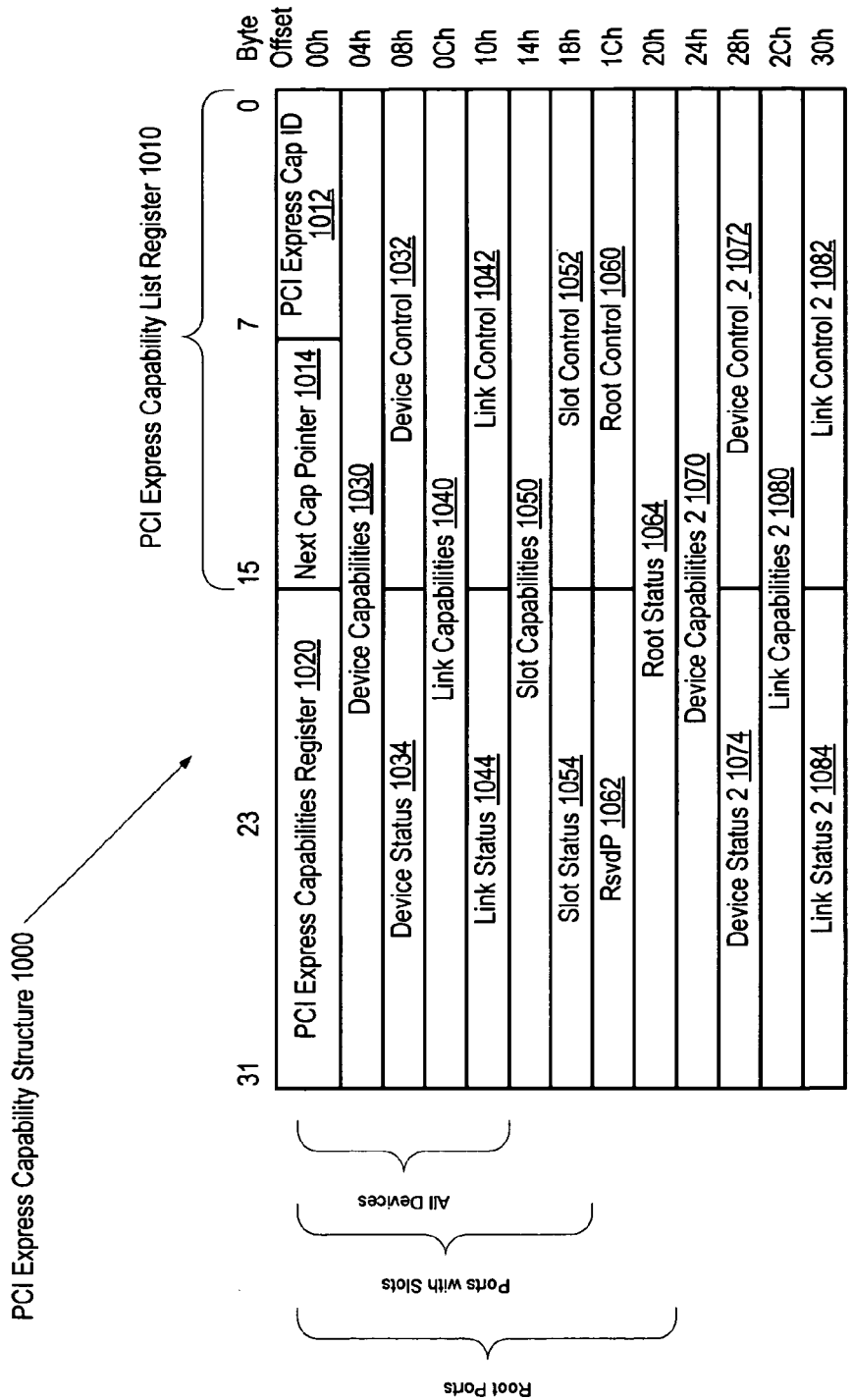
FIG. 12 illustrates one embodiment of a PCI Express Capability Structure.

FIG. 12 illustrates one embodiment of a PCI Express capability structure 1000. PCI Express devices are generally required to have a PCI Express capability structure. The capability structure is a mechanism for enabling PCI software-transparent features requiring support on legacy operating systems. In addition to identifying a PCI Express device, PCI Express capability structure 1000 may be used in one embodiment of an XR system to provide access to PCI Express specific control/status registers and related power management enhancements. In the illustrated embodiment, PCI Express capability structure 1000 includes a PCI express capability ID 1012, a next capability pointer 1014, a PCI Express capabilities register 1020, a device capabilities register 1030, a device control register 1032, a device status register 1034, a link capabilities register 1040, a link control register 1042, a link status register 1044, a slot capabilities register 1050, a slot control register 1052, a slot status register 1054, a root control register 1060, a reserved register 1062, a root status register 1064, a device capabilities 2 register 1070, a device control 2 register 1072, a device status 2 register 1074, a link capabilities 2 register 1080, a link control 2 register 1082, and a link status 2 register 1084. The remaining bytes illustrate new PCI Express features in this embodiment.

As described below, the PCI express capabilities register 1020, device capabilities register 1030, device control register 1032, device status register 1034, link capabilities register 1040, link control register 1042, and link status register correspond to registers that are required for PF's in PCI Express SR-IOV devices. In addition, VF's may implement portions of the PCI express capabilities, device capabilities, and device status/control registers. Endpoints may not implement registers other than those listed above and may terminate the capability structure.

PCI Express capability list register 1010 (offset 00h of PCI Express capability structure 1000) enumerates the PCI express capability structure 1000 in the PCI 2.3 configuration space capability list. PCI Express capability list register 1010 may include capability ID 1012 and next capability pointer 1014. Table 4 provides the bit definitions of one embodiment of PCI Express capability list register 1010.

TABLE 4

PCI Express Capability List Register 1010

| Bit Location | PF and VF Register Differences from Base 1.1 | PF Attributes | VF Attributes | XR Attributes |
|---|---|---|---|---|
| 7:0 | Capability ID 1012 | Base 1.1 | Base 1.1 | E |
| 15:8 | Next Capability Pointer 1014 | Base 1.1 | Base 1.1 | E |

PCI Express capabilities register 1020 (offset 02h of PCI Express capability structure 1000) identifies PCI Express device type and associated capabilities. Table 5 details allocation of register fields and the respective bit definitions in one embodiment of PCI Express capabilities register 1020.

TABLE 5

PCI Express Capabilities Register 1020

| Bit Location | PF and VF Register Differences from Base 1.1 | PF Attributes | VF Attributes | XR Attribute |
|---|---|---|---|---|
| 3:0 | Capability Version | Base 1.1 | Base 1.1 | E |
| 7:4 | Device/Port Type - In one embodiment, SR-IOV capable devices indicate a Device Type of 0000b (PCI Express Endpoint Device). | Base 1.1 | Base 1.1 | E |
| 8 | Slot Implemented - In one embodiment, this bit does not apply to PF's or VF's and may be hardwired to 0b. | Base 1.1 | Base 1.1 | E |
| 13:9 | Interrupt Message Number | Base 1.1 | Base 1.1 | E |
| 14 | TCS Routing Supported - In one embodiment, this bit is not applicable to Endpoint devices and may be hardwired to 0b. | Base 2.0 | Base 2.0 | E |

Device capabilities register 1030 (offset 04h of PCI Express capability structure 1000) identifies PCI Express device specific capabilities. Table 6 details allocation of register fields and bit definitions in one embodiment of device capabilities register 1030.

TABLE 6

Device Capabilities Register 1030

| Bit Location | PF and VF Register Differences from Base 1.1 | PF Attributes | VF Attributes | XR Attribute |
|---|---|---|---|---|
| 2:0 | Max_Payload_Size Supported. For XR device implementation, see below. | Base 1.1 | Base 1.1 | X/E |
| 4:3 | Phantom Functions Supported - In one embodiment, when the SR-IOV Capability is enabled, use of Phantom Function numbers by this PF and associated VF's is not permitted and this register must return 00b when read. | Base 1.1 | RO | E |
| 5 | Extended Tag Field Supported In one embodiment, XR device 550 may tie this bit to '0' since it is enabled in PF's only. | Base 1.1 | Base 1.1 | X |
| 8:6 | Endpoint L0s Acceptable Latency | Base 1.1 | Base 1.1 | E |
| 11:9 | Endpoint L1 Acceptable Latency | Base 1.1 | Base 1.1 | E |
| 12 | Undefined - In one embodiment, the value read from this bit is undefined in Base 1.1 (was previously Attention Button Present). | Base 1.1 | Base 1.1 | E |
| 13 | Undefined - In one embodiment, the value read from this bit is undefined in Base 1.1 (was previously Attention Indicator Present). | Base 1.1 | Base 1.1 | E |
| 14 | Undefined - In one embodiment, the value read from this bit is undefined in Base 1.1 (was previously Power Indicator Present). | Base 1.1 | Base 1.1 | E |
| 15 | Role-Based Error Reporting In one embodiment, this bit may be set for devices that conform to the SR-IOV specification. | Base 1.1 | Base 1.1 | E |
| 25:18 | Captured Slot Power Limit Value - In one embodiment, this field may be hardwired to '0' in the VF's. Further, XR device 550 may terminate set slot power limit messages and update this field. | Base 1.1 | RO | X |
| 27:26 | Captured Slot Power Limit Scale - In one embodiment, this field may be hardwired to '0' in the VF's. Further, XR device 550 may terminate set slot power limit messages and update this field. | Base 1.1 | RO | X |
| 28 | Function Level Reset Capability - In one embodiment, this bit is required for SR-IOV devices (PF's and VF's) and may be hardwired to '1'. Note: This field was added in the Base 2.0 specification. | Base 2.0 | Base 2.0 | E |
| 31:29 | RsvdP | | | |

Device control register 1032 (offset 08h of PCI Express capability structure 1000) controls PCI Express device specific parameters. Table 7 details allocation of register fields and provides the respective bit definitions in one embodiment of device control register 1032.

TABLE 7

Device Control Register 1032

| Bit Location | PF and VF Register Differences from Base 1.1 | PF Attributes | VF Attributes | XR Attribute |
|---|---|---|---|---|
| 0 | Correctable Error Reporting Enable - In one embodiment, this bit does not apply to VF's and may be hardwired to 0b for VF's. Further, XR device 550 may implement this bit as a R/W bit. If not enabled, correctable error messages from the endpoint may be discarded by XR device 550. | Base 1.1 | RO | X |
| 1 | Non-Fatal Error Reporting Enable - In one embodiment, this bit does not apply to VF's and may be hardwired to 0b for VF's. Further, XR device 550 may implement this bit as a R/W bit. If not enabled, correctable error messages from the endpoint may be discarded by XR device 550. | Base 1.1 | RO | X |
| 2 | Fatal Error Reporting Enable - In one embodiment, this bit does not apply to VF's and may be hardwired to 0b for VF's. Further, XR device 550 may implement this bit as a R/W bit. If not enabled, correctable error messages from the endpoint may be discarded by XR device 550. | Base 1.1 | RO | X |
| 3 | Unsupported Request Reporting Enable - In one embodiment, this bit does not apply to VF's and may be hardwired to 0b for VF's. Further, XR device 550 may implement this bit as a R/W bit. If not enabled, correctable error messages from the endpoint may be discarded by XR device 550. | Base 1.1 | RO | X |
| 4 | Enable Relaxed Ordering - In one embodiment, this bit may be hardwired to 0b for VF's. XR device 550 may provide R/W bit per VH. If not set, and a packet has the relaxed ordering bit set, XR device 550 may clear the relaxed ordering bit in the packet forwarded upstream. In addition, relaxed ordering may be disabled in each PF, and XR device 550 may provide a R/W bit per VH, that doesn't do anything. | Base 1.1 | RO | X |
| 7:5 | MaxPayloadSize - In one embodiment, MaxPayloadSize is a PF setting that applies to all associated VF's as well and may be hardwired to 0b for VF's. A detailed description of how XR device 550 may handle this setting is provided below. | Base 1.1 | RO | X |
| 8 | Extended Tag Field Enable - In one embodiment, Extended Tag Field Enable is a PF setting that applies to all associated VF's as well and may be hardwired to 0b for VF's. Further, XR device 550 may not support extended tag (XR software 570 may set PF bit to '0'). XR device 550 may allow Writes/Reads to pass through since VF ties this bit to '0'. | Base 1.1 | RO | E |
| 9 | Phantom Functions Enable - In one embodiment, if SR-IOV is enabled, this bit may be hardwired to 0. | Base 1.1 | RO | E |
| 10 | Auxiliary (AUX) Power PM Enable In one embodiment, this bit may be hardwired to 0b for VF's. | Base 1.1 | RO | E |
| 11 | Enable No Snoop - In one embodiment, the PF setting of this bit applies to all associated VF's as well and this bit may be hardwired to 0b for VF's. Further, XR | Base 1.1 | RO | E |

TABLE 7-continued

Device Control Register 1032

| Bit Location | PF and VF Register Differences from Base 1.1 | PF Attributes | VF Attributes | XR Attribute |
|---|---|---|---|---|
| | device 550 may not support 'no snoop'. XR software 570 may set this bit for a PF to '0'. XR device 550 may allow Write/Read to pass through since each VF ties this bit to '0'. | | | |
| 14:12 | Max_Read_Request_Size - In one embodiment, the PF setting of these bits applies to all associated VF's as well and these bits may be hardwired to 0b for VF's. These bits may be programmable by XR software 570 as described in further detail below. | Base 1.1 | RO | X |
| 15 | Initiate Function Level Reset - In one embodiment, this bit may be required for SR-IOV devices (PF's and VF's). Further, each SR endpoint may implement this bit per VF, and roots may use this bit to reset an SR endpoint. Also if PCI-E reset is asserted (such as when a link is down, there is a secondary bus reset, etc . . . ), XR device 550 may set a VF's FLR (i.e., send a packet to set FLR). | Base 2.0 | Base 2.0 | S |

Max Payload Size (MPS)—In one embodiment, an MPS of "128 bytes always" may be supported as a lowest common denominator. In alternative embodiments, a vendor-defined extended capability may be implemented by each SR endpoint that is XR-compatible. One example of extended capabilities may be found on page 469 of the PCIe 1.1 base specification. In a further embodiment, this capability provides bits that separate the MPS checking from the MPS generation. When enabled, the endpoint may be configured to have one MPS value that is used when data packets are generated and a different value for MPS checking. The packet generation MPS may be set to the smallest value used by any of the roots connected to the XR device. The packet checking MPS may be set to the largest value used by any of the roots connected to the XR device. The XR device may scoreboard the MPS from all the roots and resolve the largest/smallest values of all roots that are operating i.e., (not reset). If a root's reset state changes (goes into reset or comes out of reset), both MPS values may change. In an alternative embodiment, each VF may have a different value of MPS that is defined in the vendor-defined extended capability implemented by each SR endpoint. Note if the endpoint does not implement the extended capability, then the XR device may use a default MPS value of 128 bytes always.

In a still further embodiment, MPS may be programmed by XR software 570 to emulate the MPS of an underlying PCIe device. Similarly, other fields or bits within fields of the configuration space or capabilities structure may be emulated by XR device 550 directly or via XR software 570.

In an alternative embodiment, MR switch 540 may set the value of the MPS for SR endpoint 560 to the maximum supported value, advertising this setting to all OS's. If an OS sets the MPS to lower value than the maximum supported, downstream packets (Root-to-Endpoint) are compliant because they will be smaller than the MPS of the endpoint. However, upstream packets (Endpoint-to-Root) may exceed the MPS required by the root. Therefore, upstream packets may be segmented by MR switch 540 so that each segment packet will adhere to the MPS required by the root.

XR device 550 may offer a variety of Maximum Read Request Size (MRRS) values. In one embodiment, the Maximum Read Request Size within a Type 0 CFG space may be programmable within the XR device 550 switch. For example, XR software 570 may initially configure the Maximum Read Request Size value to the lowest common denominator (128 byte). In an alternative embodiment, XR software 570 may set the Maximum Read Request Size value to the smallest root-supported value, provided the values are know for all roots. If the values of the Maximum Read Request Size are not known for all roots, XR software may wait until each VH is enabled and issue a write to the MRRS. If XR software 570 configures a value and subsequently, a VH issues a write too MRRS requesting a lower value, packets may be segmented within the XR device 550.

Device status register 1034 (offset 0Ah of PCI Express capability structure 1000) provides information about PCI Express device specific parameters. Table 8 details allocation of register fields and provides the respective bit definitions in one embodiment of device status register 1034.

TABLE 8

Device Status Register 1034

| Bit Location | PF and VF Register Differences from Base 1.1 | PF Attributes | VF Attributes | XR Attribute |
|---|---|---|---|---|
| 0 | Correctable Error Detected | Base 1.1 | Base 1.1 | E |
| 1 | Non-Fatal Error Detected | Base 1.1 | Base 1.1 | E |
| 2 | Fatal Error Detected | Base 1.1 | Base 1.1 | E |
| 3 | Unsupported Request Detected In one embodiment, XR device 550 may | Base 1.1 | Base 1.1 | S |

TABLE 8-continued

Device Status Register 1034

| Bit Location | PF and VF Register Differences from Base 1.1 | PF Attributes | VF Attributes | XR Attribute |
|---|---|---|---|---|
| | emulate this bit for an address out of range check. SR endpoint 560 may also implement this bit per PF. Consequently, this bit may be shared (merged on read, written to both places on write). | | | |
| 4 | AUX Power Detected In one embodiment this bit may be hardwired to 0b for VF's. Further, if XR device 550 supports wake on LAN, this bit may be tied to '0'. | Base 1.1 | RO | E |
| 5 | Transactions Pending - When set indicates that a particular function (PF or VF) has issued Non-Posted Requests that have not been completed. A function may report this bit cleared only when all Completions for any outstanding Non-Posted Requests have been | Base 1.1 | Base 1.1 | E |
| 15:6 | RsvdZ | | | |

Link capabilities register 1040 (offset 0Ch of PCI Express capability structure 1000) identifies PCI Express Link specific capabilities. Table 9 details allocation of register fields and provides the respective bit definitions in one embodiment of link capabilities register 1040.

TABLE 9

Link Capabilities Register 1040

| Bit Location | PF and VF Register Differences from Base 1.1 | PF Attributes | VF Attributes | XR Attribute |
|---|---|---|---|---|
| 3:0 | Supported Link Speeds | Base 1.1 | Base 1.1 | E |
| 9:4 | Maximum Link Width | Base 1.1 | Base 1.1 | E |
| 11:10 | Active State Power Management (ASPM) Support | Base 1.1 | Base 1. | 1 E |
| 14:12 | L0s Exit Latency | Base 1.1 | Base 1.1 | E |
| 17:15 | L1 Exit Latency | Base 1.1 | Base 1.1 | E |
| 18 | Clock Power Management | Base 1.1 | Base 1.1 | E |
| 19 | Surprise Down Error Reporting Capable - In one embodiment, this bit may be hardwired to 0b for Upstream Ports. | Base 1.1 | Base 1.1 | E |
| 20 | Data Link Layer Link Active Reporting Capable - In one embodiment, this bit may be hardwired to 0b for Upstream Ports. | Base 1.1 | Base 1.1 | E |
| 21 | Link Bandwidth Notification Capability - In one embodiment, this bit may not applicable to endpoint devices and may be hardwired to 0b for Upstream Ports. | Base 2.0 | Base 2.0 | E |
| 31:24 | Port Number | Base 1.1 | Base 1.1 | E |

Note that if L1 state is not supported for Active State Link PM (as reported in the Active State Link PM Support field) then the L1 Exit latency field may be ignored. XR device 550 may ensure type1 and endpoint bridges are consistent with respect to negotiated link parameters (width, speed).

Link control register 1042 (offset 10h of PCI Express capability structure 1000) controls PCI Express Link specific parameters. Table 10 details allocation of register fields and the respective bit definitions in one embodiment of link control register 1042.

TABLE 10

Link Control Register 1042

| Bit Location | PF and VF Register Differences from Base 1.1 | PF Attributes | VF Attributes | XR Attribute |
|---|---|---|---|---|
| 1:0 | Active State Power Management (ASPM) Control In one embodiment, these bits may be hardwired to 0b for VF's and XR device 550 may implement as read/write. | Base 1.1 | RO | X |
| 2 | RsvdP | | | |

TABLE 10-continued

Link Control Register 1042

| Bit Location | PF and VF Register Differences from Base 1.1 | PF Attributes | VF Attributes | XR Attribute |
|---|---|---|---|---|
| 3 | Read Completion Boundary (RCB) In one embodiment, this bit may be hardwired to 0b for VF's and XR device 550 may implement as read/write. XR software 570 may set PF to 64 bytes. There may be no check against RCB. | Base 1.1 | RO | X |
| 4 | Link Disable - In one embodiment, this bit may be reserved for endpoint devices and hardwired to 0b. | Base 1.1 | Base 1.1 | E |
| 5 | Retrain Link - In one embodiment, this bit may be reserved for endpoint devices and hardwired to 0b. | Base 1.1 | Base 1.1 | E |
| 6 | Common Clock Configuration - In one embodiment, this bit may be hardwired to 0b for VF's and XR device 550 may implement as read/write. | Base 1.1 | RO | X |
| 7 | Extended Synch In one embodiment, this bit may be hardwired to 0b for VF's and XR device 550 may implement as read/write. | Base 1.1 | RO | X |
| 8 | Enable Clock Power Management In one embodiment, this bit may be hardwired to 0b for VF's | Base 1.1 | RO | X |
| 9 | Hardware Autonomous Width Disable In one embodiment, this bit may be hardwired to 0b for VF's | Base 2.0 | RO | E |
| 10 | Link Bandwidth Management Interrupt Enable - In one embodiment, this bit may not apply to endpoint devices and may be hardwired to 0b. | Base 2.0 | Base 2.0 | E |
| 11 | Link Autonomous Bandwidth Interrupt Enable - In one embodiment, this bit may not apply to endpoint devices and may be hardwired to 0b. | Base 2.0 | Base 2.0 | E |
| 15:12 | RsvdP | | | |

Link status register 1044 (offset 12h of PCI Express capability structure 1000) provides information about PCI Express Link specific parameters. Table 11 details allocation of register fields and the respective bit definitions in one embodiment of link status register 1044.

TABLE 11

Link Status Register 1044

| Bit Location | PF and VF Register Differences from Base 1.1 | PF Attributes | VF Attributes | XR Attribute |
|---|---|---|---|---|
| 3:0 | Current Link Speed In one embodiment, may be hardwired to 0b for VF's and XR device 550 may read PF value and return it. | Base 1.1 | RO | X |
| 9:4 | Negotiated Link Width In one embodiment, may be hardwired to 0b for VF's and XR device 550 may read PF value and return it. | Base 1.1 | RO | X |
| 10 | Undefined - The value read from this bit is undefined in Base 1.1 (was previously Training Error). XR device 550 may read PF value and return it. | Base 1.1 | Base 1.1 | E |
| 11 | Link Training - Reserved for Endpoint devices. In one embodiment, may be hardwired to 0b for VF's and XR device 550 may read PF value and return it. | Base 1.1 | Base 1.1 | E |
| 12 | Slot Clock Configuration In one embodiment, may be hardwired to 0b for VF's and XR device 550 may read PF value and return it. | Base 1.1 | RO | X |

TABLE 11-continued

Link Status Register 1044

| Bit Location | PF and VF Register Differences from Base 1.1 | PF Attributes | VF Attributes | XR Attribute |
|---|---|---|---|---|
| 13 | Data Link Layer Link Active<br>In one embodiment, may be hardwired to 0b for VF's and XR device 550 may read PF value and return it. | Base 1.1 | RO | X |
| 14 | Link Bandwidth Management Status -<br>Reserved for Endpoint devices. In one embodiment, may be hardwired to 0b for VF's and XR device 550 may read PF value and return it. | Base 2.0 | Base 2.0 | E |
| 15 | Link Autonomous Bandwidth Status -<br>Reserved for Endpoint devices. In one embodiment, may be hardwired to 0b for VF's and XR device 550 may read PF value and return it. | Base 2.0 | Base 2.0 | E |

TABLE 12

Device Capabilities 2 Register 1070
(offset 24h of PCI Express capability structure 1000)

| Bit Location | PF and VF Register Differences from Base 2.0 | PF Attributes | VF Attributes | XR Attribute |
|---|---|---|---|---|
| 3:0 | Completion Timeout Ranges Supported<br>In one embodiment, XR device 550 may advertise that this feature is not supported. | Base 2.0 | Base 2.0 | E |
| 4 | Completion Timeout Disable Supported<br>In one embodiment, XR device 550 may advertise that disabling Completion Timeout is not supported. | Base 2.0 | Base 2.0 | E |

TABLE 13

Device Control 2 Register 1072
(offset 28h of PCI Express capability structure 1000)

| Bit Location | PF and VF Register Differences from Base 2.0 | PF Attributes | VF Attributes | XR Attribute |
|---|---|---|---|---|
| 3:0 | Completion Timeout Value<br>In one embodiment, may be hardwired to 0b for VF's and XR device 550 may allow this bit to go to the VF tied to '0' and advertise that configurable Completion Timeouts are not supported. | Base 2.0 | RO | X |
| 4 | Completion Timeout Disable<br>In one embodiment, may be hardwired to 0b for VF's and XR device 550 may allow this bit to '0' go to the VF tied to and advertise that it is not supported. | Base 2.0 | RO | X |

Device status 2 register 1074 (offset 2Ah of PCI Express capability structure 1000)

Link capabilities 2 register 1080 (offset 2Ch of PCI Express capability structure 1000)

TABLE 14

Link Control 2 Register 1082
(offset 30h of PCI Express capability structure 1000)

| Bit Location | PF and VF Register Differences from Base 2.0 | PF Attributes | VF Attributes | XR Attribute |
|---|---|---|---|---|
| 3:0 | Target Link Speed<br>In one embodiment, may be hardwired to 0b for VF's and XR device 550 may tie these bits to values representing 2.5 Gb/s. Target Speed Status, if used, may also be forced to 2.5 Gb/s by XR device 550. | Base 2.0 | RO | X |

TABLE 14-continued

Link Control 2 Register 1082
(offset 30h of PCI Express capability structure 1000)

| Bit Location | PF and VF Register Differences from Base 2.0 | PF Attributes | VF Attributes | XR Attribute |
|---|---|---|---|---|
| 4 | Enter Compliance<br>In one embodiment, may be hardwired to 0b for VF's and XR device 550 may tie this bit to '0' (allowed since Target Link Speed maybe hardwired to 2.5 Gb/s). | Base 2.0 | RO | X |
| 5 | Hardware Autonomous Speed Disable<br>In one embodiment, may be hardwired to 0b for VF's and XR device 550 may allow the endpoint to hardwire to '0'. | Base 2.0 | RO | E |
| 6 | Selectable De-emphasis - Reserved for Endpoint devices. In one embodiment, may be hardwired to 0b. | Base 2.0 | Base 2.0 | E |
| 9:7 | Transmit Margin<br>In one embodiment, may be hardwired to 0b for VF's and XR device 550 may hardwire to '0' since only one target Link Speed, 2.5 Gb/s, is supported. | Base 2.0 | RO | X |
| 10 | Enter Modified Compliance<br>In one embodiment, may be hardwired to 0b for VF's and XR device 550 may hardwire to '0' since only one target Link Speed, 2.5 Gb/s, is supported. | Base 2.0 | RO | X |

TABLE 15

Link Status 2 Register 1084
(offset 32h of PCI Express capability structure 1000)

| Bit Location | PF and VF Register Differences from Base 2.0 | PF Attributes | VF Attributes | XR Attribute |
|---|---|---|---|---|
| 0 | Current De-emphasis Level<br>In one embodiment, may be hardwired to 0b for VF's and XR device 550 may allow the endpoint to return 0. | Base 2.0 | RO | E |

PCI Standard Capabilities

One PCI Standard Capability that may be implemented in various embodiments of system 400 is PCI Power Management Capability. This capability is required for PF's and VF's. No changes are made related to this capability within XR device 550.

TABLE 16

PCI Power Management Capability

| Bit Location | PF and VF Register Differences from Base 2.0 | PF Attributes | VF Attributes | XR Attribute |
|---|---|---|---|---|
| 15:11 | PME_Support | Base 1.1 | Base 1.1 | E |
| 10 | D2_Support | Base 1.1 | Base 1.1 | E |
| 9 | D1_Support | Base 1.1 | Base 1.1 | E |
| 8:6 | Aux_Current | Base 1.1 | Base 1.1 | E |
| 5 | Device Specific Initialization (DSI) | Base 1.1 | Base 1.1 | E |
| 4 | Reserved | Base 1.1 | Base 1.1 | E |
| 3 | PME clock | Base 1.1 | Base 1.1 | E |
| 2:0 | Version | Base 1.1 | Base 1.1 | E |

TABLE 17

Power Management Control/Status Table

| Bit Location | PF and VF Register Differences from Base 2.0 | PF Attributes | VF Attributes | XR Attribute |
|---|---|---|---|---|
| 15 | PME_Status | Base 1.1 | Base 1.1 | E |
| 14:13 | Data_Scale Optional if data register is implemented. In one embodiment, XR device 550 may pass through. | Base 1.1 | 00b | E |
| 12:9 | Data_Select Optional if data register is implemented. In one embodiment, XR device 550 may pass through. | Base 1.1 | 0000b | E |
| 8 | PME_En | Base 1.1 | Base 1.1 | E |
| 7:4 | Reserved | Base 1.1 | Base 1.1 | E |
| 3 | No_Soft_Reset | Base 1.1 | Base 1.1 | E |
| 2 | Reserved | Base 1.1 | Base 1.1 | E |
| 1:0 | Power State | Base 1.1 | Base 1.1 or 00b | E |

Another PCI Standard Capability that may be implemented in one embodiment of system 400 is Power Management Messages. XR device 550 may contain a configurable mechanism to convert PME_TO (PME Turn Off) messages into Vendor Defined Type 1 messages. This ensures that PME_TO messages from a root do not cause an endpoint to turn off so that it can continue to be used by other VHs that are not turning off.

Another PCI Standard Capability that may be implemented in one embodiment of system 400 is Vital Product Data (VPD) capability. VPD capability is optional (as with the base spec) in PF's. The VPD capability is not specified for VF's and may be implemented; however, it is a requirement that there can be no "data leakage" between VF's and/or PF's via the VPD capability if it is implemented in VF's. In one embodiment, XR device 550 may not support VPD. In alternative embodiment, support for VPD within XR device 550 may be provided in a variety of ways. For example, in one embodiment, VPD may be supported in PF's and VF's such that VPD is passed unchanged through XR device 550. In another embodiment, VPD may be supported in PF's but not in VF's. For example, XR device 550 may not support VPD in SR endpoint 560. Alternatively, XR device 550 may support VPD in SR endpoint 560 by inserting a VPD capability into a linked list structure in SR endpoint 560. For read-only sections of VPD, the PF may be read and the data returned. For writes, a variety of embodiments are possible and are contemplated. For example, XR device 550 may not write to Sr endpoint 560. Alternatively, XR device 550 may write to SR endpoint 550 and allow writes to update the PF. However, in this case all VH's share the same write register. In another alternative, XR device 550 may emulate all the read/write bits in the VPD. When a root does a write, XR device 550 may read/write/write the original data in the register to verify that it is read/write. XR device 550 may then store the write data for that VH. IN yet another alternative embodiment, XR software 570 may perform emulation of the read/write bits in the VPD.

PCI Express Extended Capabilities

One PCI Express Extended Capability that may be implemented in some embodiments of system 400 is support for Virtual Channels (02h). Support for Virtual Channels is optional in physical functions and does not apply to virtual functions. In one embodiment, virtual channels may be supported through a combination of XR device 550 and XR software 570. For example, each VH may be mapped to an independent VC. XR device 550 may be configured by XR software 570 with a linked list of capabilities in which virtual channel capability is linked on to the end of the list. XR software 570 may implement a resolution policy to program the PF virtual channel capability based on the VF virtual channel capability configuration.

Another PCI Express Extended Capability that may be implemented in one embodiment of system 400 is ACS. The ACS capability is optional and may be implemented in physical and virtual functions. Each function that implements the capability must implement the capability separately. In an XR system, ACS may be handled in the VF. ACS configures how an endpoint deals with inter-function communication (packets sourced from one function in the endpoint and destined for another function in the endpoint). Inter-function communication (referred to as peer-to-peer or P2P in the specification), may be detected by looking at the routing information of a packet i.e. address. There are four things that may be configured:

1. P2P request redirect—if set, all requests that are detected as peer-to-peer (inter-function) must be routed to the root (rather than being routed internally from one function to the other).
2. P2P completion redirect—if set, all completions that are detected as peer-to-peer must be routed to the root.
3. P2P egress control—Per function can configure which other functions are enabled for peer-to-peer communication. If a peer-to-peer packet is detected and it is not enabled in the egress control, an error may be generated.
4. Direct translated P2P—If enabled, all addresses that are translated through ATS may be allowed to go peer-to-peer regardless of the P2P request redirect bit.

ACS Request Redirect and Completion Redirect may be used within a VF to direct P2P packets to XR device 550. In one embodiment, XR device 550 may translate these packets and forward them onward, the same VF or to a different VF of SR endpoint 560.

Another PCI Express Extended Capability that may be implemented in one embodiment of system 400 is Alternate Routing Identifier (ARI). SR-IOV Devices with PF's or VF's that cannot be addressed within the Device Number=0 and Function Number <8 constraints of 1.x versions of PCIe, must implement the ARI capability in the PF's. SR-IOV aware PCIe devices may implement the ARI capability in both PF's and VF's, thus permitting software to use ACS Function Groups for certain routing and arbitration functions as described in the PCIe specification. For PF's, the ARI 'Next Function Number' field in the ARI control register may be used to link to the next PF. The VF's 'Next Function Number' field in the ARI control register is undefined. Note:

VF's may be located using the SR-IOV capability and are not included in any ARI 'Next Function Number' list. XR device 550 may support SR endpoints that utilize the ARI capability. Specifically, translations in XR device 550 may address Function Numbers in the SR-IOV device that are greater than or equal to 8 and may reside on any bus number. XR device 550 may implement the ARI capability to support more than 8 Functions in a particular VH or to utilize function grouping functionality.

It is noted that PCIe capability blocks may have different addresses in different PCI devices. Capabilities are linked together in a capability list for software to locate them. In one embodiment, capabilities offered by XR device 550 are at fixed addresses that may not match the addresses of similar capabilities in the underlying VF or PF.

XR Device Functionality.

Figure 13:
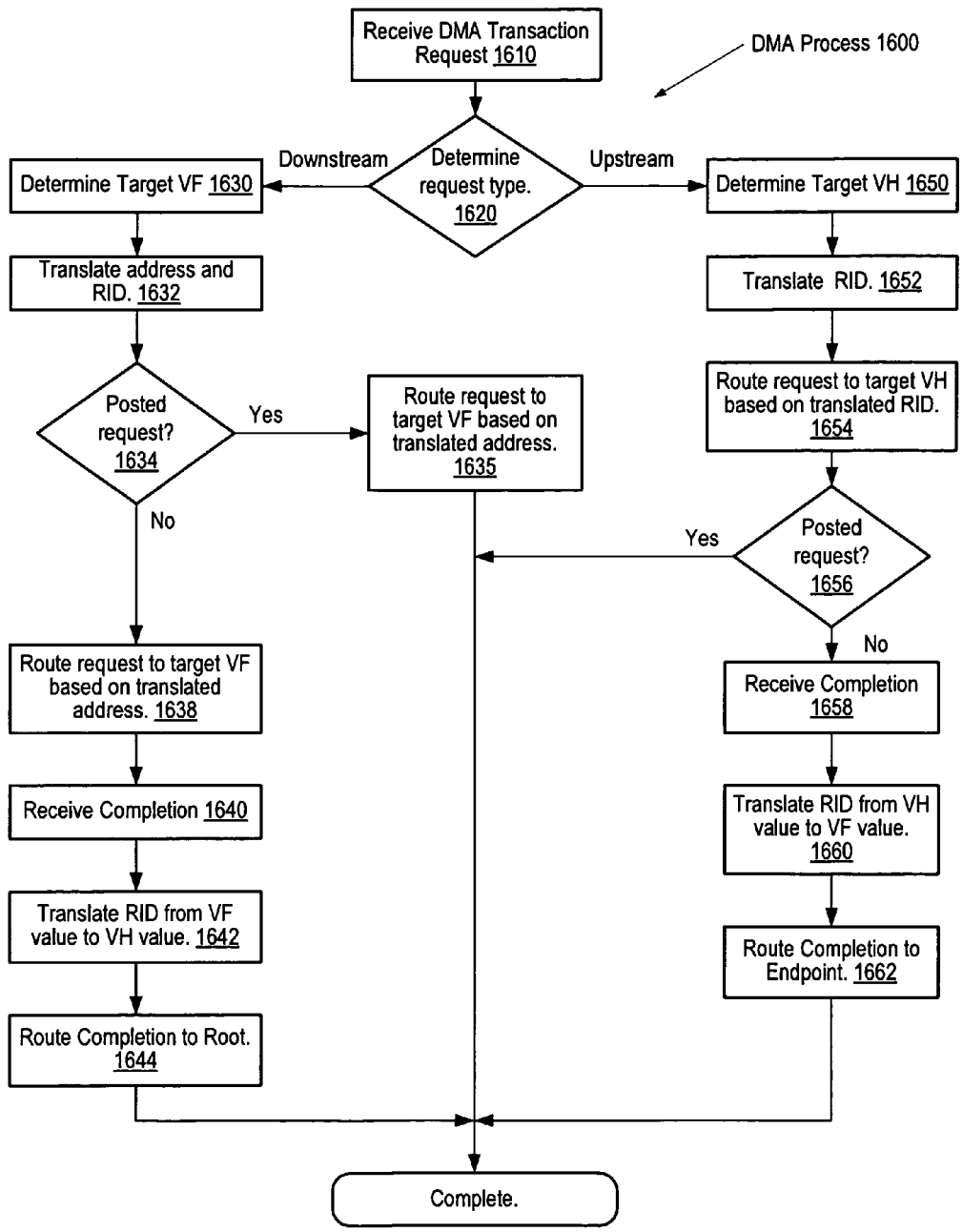
FIG. 13 illustrates one embodiment of a DMA process.

In one embodiment, XR device 550 may implement direct memory access (DMA)/Data Movement. FIG. 13 illustrates one embodiment of a DMA process 1600. Process 1600 may begin with the reception of a DMA transaction request (block 1610). If the request is a downstream request (decision block 1620), the target VF may be determined (block 1630) and the target address and RID translated (block 1632). For example, in the embodiment illustrated in FIG. 10, XR device 550 may translate the target address from the root's emulated BAR in XR device 550 to the correct address in the endpoint for the target VF. Note the address in the endpoint may be setup by XR software 570 (using the SR stride-based mechanism described above). In addition, XR device 550 may translate the requestor ID (RID) from a value in the VH space into the corresponding RID in the device space using a mechanism described below (block 1634). These translations may be done in the downstream block of translator 552. If the request is a posted request (decision block 1635), it may be routed to the target VF based on the translated address (block 1636), completing the DMA request process and allowing data access to proceed. If the request is not a posted request (decision block 1635), the request may be routed to a target VF based on the translated address (block 1638). After the request is routed, a completion may be received indicating the access has competed (block 1640). An RID in the completion may be translated from its VF value to a corresponding VH value (block 1642) and the completion routed to the originating root (block 1644), completing the DMA process. In the embodiment of FIG. 10, this translation may be done in the downstream block of translator 552.

Returning to decision block 1620, if the request is an upstream request, the target VH may be determined (block 1650) and the RID included in the request translated (block 1652) via any of a variety of processes, one of which is described in detail below. For example, generally speaking, in the embodiment illustrated in FIG. 10, XR device 550 may translate the RID from the endpoint to the correct VH. There may be no address translation for endpoint to root packets. The RID of the request may be translated from function 0 (or function N) to the RID of the VF for the upstream packet. This translation may be done in the upstream block of translator 552. The request may then be routed to the target VH based on the translated RID (block 1654). If the request is a posted request (decision block 1656), the DMA process is complete since no completion is to be expected. If the request is not a posted request (decision block 1656), a subsequent completion may be received from the VH indicating the access has competed (block 1658). An RID in the subsequent completion may be translated from its VH value to a corresponding VF value (block 1660) and the completion routed to the originating endpoint (block 1662), completing the DMA process.

As noted above, DMA Transactions that originate in the SR endpoint may include a RID associated with the requesting function (for example, a VF). Translator 552 may use this RID to determine which VH is associated with which transaction, and forward the request to the proper VH, translating the RID of the request to the RID of the requesting device within that VH using one of a variety of mechanisms. For instance, in one embodiment, translator 552 may use the PCIe RID as an index to determine the correct VH. More particularly, translator 552 may maintain a reverse table for translating RID values to VH values. In another embodiment, translator 552 may utilize a stride mechanism. Using this stride mechanism three hierarchies may be distinguished as follows:

VH0=Endpoint RID+RID offset
VH1=Endpoint RID+RID offset+(1*RID stride)
VH2=Endpoint RID+RID offset+(2*RID stride)

DMA operations may support a number of additional features, such as:

Setup: The root writes the descriptor location to the Endpoint. Root-to-Endpoint translation occurs (see above).

Descriptor Read: The endpoint reads the descriptor from the root's memory. Endpoint-to-Root translation occurs (see above).

DMA operation: The endpoint writes/reads the root's memory. Endpoint-to-Root translation occurs.

Descriptor Write: The endpoint writes status to a descriptor in the root's memory. Endpoint-to-Root translation occurs.

Interrupt: The endpoint interrupts the root to signal it is done with the DMA operation. If MSI/MSI-X is used, Endpoint-to-Root translation occurs. If INTx is used see INTx emulation. Interrupt service: The root reads and clears the endpoint status and Root-to-Endpoint translation occurs.

In a further embodiment, system 400 may support a DMA Engine (TX Work Queue, TX Free, RX Work, RX Free). In a still further embodiment, SR endpoint 560 may have multiple address spaces for the VF's. XR device 550 may perform VH-to-VF address translation for Root-to-Endpoint packets. XR device 550 may perform VF-to-VH address translation for Endpoint-to-Root packets.

In one embodiment, XR device 550 may support VF INTx emulation. VF's in PCI Express systems are not permitted to support MSI. If INTx support is required by a root, then XR device 550 may emulate INTx behavior in one of a variety of ways. For example, in one embodiment, XR software 570 may configure the MSI capability in the endpoint and XR device 550 may advertise INTx capability to the root. XR device 550 may terminate all MSI Posted Memory Writes and send them to the management unit 750. Management unit 750 may generate an Assert_INTx message to the root. XR device 550 may use endpoint aware software within XR software 570 to determine that a deassert is needed by snooping all writes from Root-to-Endpoint and tracking which ones are to clear interrupts. In an alternative embodiment, INTx emulation capability may be provided by SR endpoint 560. With this capability 2 MSI addresses are allocated to SR endpoint 560. One may be an INTx assert, and the other may be an INTx deassert. XR device 550 may terminate all MSI Posted Memory Writes and send them to management unit 750. Management unit 750 may decode the MSI address and send the appropriate Assert_INTx or Deassert_INTx message to the appropriate root. In another alternative embodiment, INTx emulation capability may be provided by a combination of SR endpoint 560 and the VF driver. Management unit 750 may decode the MSI address and send the appropriate Assert_INTx message and VF driver software may be used to indicate to Management Unit 750 when it may send the related Deassert_INTx message.

In a further embodiment, XR device 550 may support Primary/Subordinate OS Driver communication. If the SR components that are used in an XR system require driver-to-driver communication, XR device 550 may emulate this behavior in one of a variety of ways. For instance, in one embodiment, SR endpoint 560 may implement Primary/Subordinate communication in hardware, as may be done in MR systems, where there may not be direct driver communication. More particularly, SR endpoint 560 may implement hardware that allows message passing through data registers, mailboxes, and/or doorbells. In an alternative embodiment, SR endpoint 560 may implement driver enhancements. SR endpoint 560 may add a new BAR or extend existing BAR space. The new BAR space may be used for message passing. XR device 550 may be configured to terminate the accesses to the new BAR space region of memory and take action to enable message passing. In another alternative embodiment, a manufacturer of an MR switch may provide a device driver for a new device (or function) embedded in XR device 550 that enables message passing between roots. Drivers running on the roots may call this new driver for all Primary/Subordinate communication (i.e. bind hypervisor API calls used by the endpoint driver for communication to the new device driver).

In a further embodiment, XR device 550 may support reset propagation. A reset that propagates to XR will cause a Function level Reset (FLR) specifying the correct function to be issued to the endpoint. The detection of reset propagation and the generation of the FLR to the endpoint (configuration write) is handled by management unit 750. All XR registers may take the appropriate reset action (generally, they are reset). In one embodiment, a reset originating in a specific VH may be translated into a Function level Reset (FLR) to the affected VF(s) of the Endpoint. The PCIe specification allows the endpoint 100 ms to complete the FLR. Accordingly, if a reset is received by XR device 550 that originated as a secondary bus reset and if the secondary bus reset is asserted, and subsequently deasserted, the XR device 550 may delay sending a completion for the deassert configuration write until after the specified 100 ms has expired (since issuing the FLR to the endpoint). Note the secondary bus reset can be for an upstream or a downstream bridge. Alternatively, XR device 550 may ignore the 100 ms timer and permit the endpoint to respond at any time, either doing a Completion Retry Status or accepting the configuration cycle if it comes before the 100 ms expires.

If a reset is received by XR device 550 that corresponds to a rest of an entire VH—for example, a fundamental reset on the VH (hot reset, link down, etc. . . . )—XR device 550 may assume that this reset duration is longer than the 100 ms FLR time. If a FLR is issued to XR device 550, it may be propagated to the endpoint. The FLR may take effect immediately without flushing packets before issuing the FLR to the endpoint. It is noted that FLR may be prevented from propagating if flow control from a failing endpoint has stopped (no more credits are being issued). This is an error case regardless of FLR that may be handled according to the flow control procedures described below.

XR device 550 may also be used with Multi-Function Endpoints that do not support FLR. In one embodiment, XR device 550 may contain a state machine configured to issue a sequence of Configuration and Memory Writes to emulate FLR behavior. This sequence may be configured by XR software 570. XR device 550 may issue the sequence, adjusting addresses within Configuration and Memory Space so that they address the associated underlying Function(s) in the Endpoint.

In a further embodiment, XR device 550 may support flow control. The link between XR device 550 and the SR endpoint is a base PCIe link. All of the upstream packets arriving at XR device 550 from VF's in the SR endpoint share the same flow control credits. As a result, the receive buffers in XR device 550 do not provide independent flow control for each VH. In one embodiment, XR device 550 may implement a mechanism to provide VH flow control independence. For example, flow control functionality may be included within upstream packet multiplexer 738.

Flow control for packets that flow from SR endpoint 560 to XR device 550 may be implemented as follows. XR device 550 may implement a timeout mechanism that detects when a VH has not progressed for a predetermined length of time—(the VH is "hung"). This condition may be detected by observing that a root port has not released flow control credits for a predetermined length of time. When the timeout mechanism detects that a VH is "hung" a message may be conveyed to XR software 570. In response, XR software 570 may instruct XR device 550 to purge packets from the hung VH and return any resources, such as flow control and buffer space, it may have been consuming. The VH may remain in the hung state until a reset propagates from that VH. Note that queuing is independent per VH, so other VHs can make progress as long as the hung VH does not consume all flow control credits. In an alternative embodiment, XR device 550 may declare that a VH is in the hung state. In a further embodiment, the number of packets from a single VH that may be allowed in a receive buffer may be capped at a predetermined value. If one VH exceeds its allotted buffer, all packets from that VH may be purged, and subsequent packets from that VH may be dropped and that VH declared hung. In one embodiment, this purge functionality may be implemented as part of upstream packet buffer 734.

Flow control for packets that flow from XR device 550 to SR endpoint 560 may share a single VC. Therefore, when flow control credits are not released by XR device 550 for a pre-determined time, all VF's within SR endpoint 560 that are using that VC may be declared to be "hung."

In a further embodiment, XR device 550 may support initialization of an SR endpoint after reset. On startup, each endpoint may be initialized to be in a base PCIe mode, as opposed to SR-IOV mode. Subsequently, XR software 570 may query the endpoint's SR-IOV capabilities to determine the number of VF's supported, VF offsets, BAR type, etc. XR software 570 may use this information to configure XR device 550 (number of VH's, BAR information, RID information, etc.). XR software 570 may enable SR-IOV mode in the endpoint. XR software 570 may configure the switch in which XR device 550 is embedded to reflect the number of VF's in the endpoint. Also, a "done" bit in XR device 550, or some other indicator, may be set when XR software 570 has completed the configuration. If a root tries to discover an endpoint prior to the completion of configuration, XR device 550 may act as if the link to the endpoint is unavailable.

In a further embodiment, XR device 550 may support Power Management. In one embodiment, the PF in the endpoint is kept in a D0 state, so the link will never go to a lower power state. Similarly, the link between XR device 550 and MR switch 540 may be kept out of a lower power state (except for L0s).

In a further embodiment, XR device 550 may support error handling in the following manner. Most of the XR device 550 error functionality is implemented in configuration unit 740. XR device 550 may terminate error messages sourced from SR endpoint 560 if they are not enabled to be sent to a root. This termination is done in the upstream packet decoder 732.

There are two classifications of errors, VF specific, and non-VF specific. The VF may only report VF specific errors. All non-VF specific errors may be reported by the PF (serviced by XR software 570). XR device 550 may emulate per-VF error message enables (SR endpoint 560 may implement the error message enables in the PF only). XR device 550 may throw away error messages from a VF if the emulated per-VF error message enable is not set. The per-VF errors may include:
  Poisoned packet received
  Completion Timeout
  Completer Abort
  UR, when caused by a function that claims a packet
  Unexpected Completion, when Requestor ID matches a function in the PCIe device
  ACS Violation
The non-VF errors may include:
  All Physical Layer errors
  All Data Link Layer errors
  ECRC Fail
  UR, when caused by no function claiming a packet
  Receiver Overflow
  Flow Control Protocol Error
  Malformed packet
  Unexpected Completion, when Requester ID doesn't match any function in the PCIe device In one embodiment, system 400 may support Error Detection (missing delimiter, max length, CRC). For example, SR endpoint 560 may provide error detection. These errors may be global in nature and may be managed by XR software 570.

Note XR device 550 may not emulate the non-VF errors (i.e., send any error messages that are received to all VH's of interest), because most of the errors are not detectable by XR device 550 (for example, only the SR endpoint sees Physical link errors).

XR device 550 may set errors status (error status is shared), and send error messages to all VH's when certain PF error messages are received. The XR-to-Endpoint link is treated as an "internal" bus, but if something fatal happens on that bus, it must be reported to the VH's. Correctable and NonFatal PF errors may not be relayed to the VH's (if action is required the errors may be handled by XR software 570). Note for any error status that XR device 550 is setting, the error is may be reported on the link between the Downstream Switch port and XR device 550 (for these errors the XR-to-Endpoint link may be treated as an extension of the Downstream Switch Port-to-XR link). XR device 550 may snoop data packets and set a Master Data Parity Error if a poisoned completion is received or if the requestor poisons a write request.

Table 18 lists the errors and how they are handled in an XR system. There are three cases:
1. VF error, handled by endpoint
2. PF error doesn't require VF notification, handled in PF by XR software 570
3. PF error requires VF notification; XR device 550 may emulate the error reporting from the PF to the VH.

TABLE 18

| Error Handling | | | |
| --- | --- | --- | --- |
| Error | Message Type | PF/VF | XR handling |
| Phy Receiver Error | COR | PF | In one embodiment, PF only, handle through XR software 570. |
| Bad packet (LCRC) | COR | PF | In one embodiment, PF only. |
| Bad DLLP (LCRC) | COR | PF | In one embodiment, PF only. |
| Replay Timeout | COR | PF | In one embodiment, PF only. |
| Replay Num Rollover | COR | PF | In one embodiment, PF only. |
| DLL Protocol (seq number) | FATAL | PF | In one embodiment, PF may inform all VHs. The endpoint is now broken, so the endpoint may send ERR_FATAL to all VH's and XR device 550 may emulate status. |
| Surprise Down | FATAL | PF | In one embodiment, PF may inform all VHs. The endpoint is now broken, so the endpoint may send ERR_FATAL to all VH's and XR device 550 may emulate status. |
| Poisoned packet received | NonFatal | VF | In one embodiment, VF handles, no XR device 550 action needed. |
| ECRC Check Failed | NonFatal | PF | See ECRC section |
| UR | NonFatal | PF/VF | In one embodiment, if VF UR, no XR action is needed. If "PF" UR (XR device 550 may detect these), XR device 550 may report to correct VH and emulate status. |
| Completion Timeout | NonFatal | VF | In one embodiment, VF handles. |
| Completer Abort | NonFatal | VF | In one embodiment, VF handles. |
| Unexpected Completion | NonFatal | VF/PF | In one embodiment, VF handles if RID matches some function in the endpoint. PF handles if RID doesn't match any function in the endpoint. Allow VF/PF to report to VH or XR Software 570 (XR system may ignore). |
| ACS violation | NonFatal | VF | In one embodiment, VF handles. |
| Receiver Overflow | Fatal | PF | In one embodiment, PF may inform all VHs. The endpoint is now broken, so the endpoint may send ERR_FATAL to all VH's and XR device 550 may emulate status. |

TABLE 18-continued

Error Handling

| Error | Message Type | PF/VF | XR handling |
|---|---|---|---|
| Flow Control Protocol Error | Fatal | PF | In one embodiment, PF needs to inform all VHs. The endpoint is now broken, so the endpoint may send ERR_FATAL to all VH's and XR device 550 may emulate status. |
| Malformed packet | Fatal | PF | In one embodiment, PF needs to inform all VHs. The endpoint is now broken, so the endpoint may send ERR_FATAL to all VH's and XR device 550 may emulate status. |

In yet another embodiment, XR device 550 may support Advanced Error Reporting (AER). In PCIe-compliant systems, AER is not required to be supported in the PF or VF. However, if AER is supported in the VF (including the error log), it may be exposed to the Root and work without any XR device 550 intervention. Further, if AER is supported in the VF, in one embodiment error logging may be shared (one log shared among all the VF). In this case XR device 550 may emulate the error log register per VF. When an error message is sent by the endpoint, XR device 550 may:
1. Trap the error message
2. Read the error log register. If there is an overflow reported, XR device 550 may perform one of the following steps:
 a. Ignore the error
 b. Report the error and compose an error log
 c. Report the error and leave the error log empty
3. If there is not an overflow, update an XR emulated error log
4. Send the error message to the root
Alternatively, XR device 550 may mask off AER capability from VF. Note the reading of the error log register and updating the emulated error log may be done by XR hardware 550 or XR software 570. If done by XR software 570, there may be more delay in reading the error log register, increasing the chances of missing an event.

In yet another embodiment, XR device 550 may support End-to-end Cyclic Redundancy Check (ECRC). ECRC may be enabled in the PF only (in the AER capability). Because the VF will not have an ECRC enable, in one embodiment ECRC will not be supported by XR device 550. In an alternative embodiment, if AER is supported in the VF, XR device 550 may emulate the ECRC enable bits and append ECRC as a packet is transmitted from SR endpoint 560 to a root. XR device 550 may also check the ECRC for packets from a root to SR Endpoint 560. XR device 550 may optionally strip off the ECRC before sending a packet to SR endpoint 560, such as in a case in which SR endpoint 560 is not compliant.

In other embodiments, XR device 550 may support flexible topologies. In one embodiment, an XR system may cause more than one instance of an SR endpoint to appear in a given VH. In such embodiments, XR device 550 may act as a bridge, presenting two or more instances of the endpoint, instead of just a single endpoint, allowing each VH to see multiple copies of the endpoint.

In an alternative embodiment, XR device 550 may be configured to present itself to a root as an SR endpoint, based on the structure of an actual endpoint. In this embodiment, XR device 550 may load an appropriate SR driver on each VH. XR device 550 may thereby present itself as one PF, all the SR configuration space structures, plus one or more VF's. Each VH would appear to be using its own version of an SR endpoint, while XR device 550 actually maps each PF/VF into an actual PF/VF of one or more copies of the SR endpoint.

In another embodiment, system 400 may support flash interface (upgradeable ROM). Flash interface is a PF function. This functionality may be accessed through XR software 570.

In another embodiment, system 400 may support interrupt generator (moderation) in which each VF has an MSI/MSI-X capability.

In another embodiment, each VF in system 400 may implement Packet TX/RX (unicast, broadcast, multicast).

In another embodiment of system 400, each VF may implement auto negotiation, in which each VF may report the same thing to all roots.

In another embodiment of system 400, each VF may implement TCP checksum offload, TCP segmentation, TCP reassembly.

In one embodiment, SR endpoint 560 may implement Virtual Ethernet switching.

In other embodiments, system 400 may support PXE (expansion ROM). In one embodiment, SR endpoint 560 may be configured to optionally duplicate or not duplicate ROM BAR in VF's. XR software 570 (which may maintain a map of PF address spaces) may discover whether the endpoint duplicates ROM BARs in VF's or not. If ROM BAR's are duplicated in VF's, then XR device 550 may use VF's BAR's. If not then XR device 550 may use translate all expansion ROM accesses to VF ROM BAR addresses to the endpoint. XR software 570 may configure XR device 550 in the correct operating mode (duplicate ROM BAR or not). See Expansion ROM Base Address register 946.

Configuration Process

Figure 14:
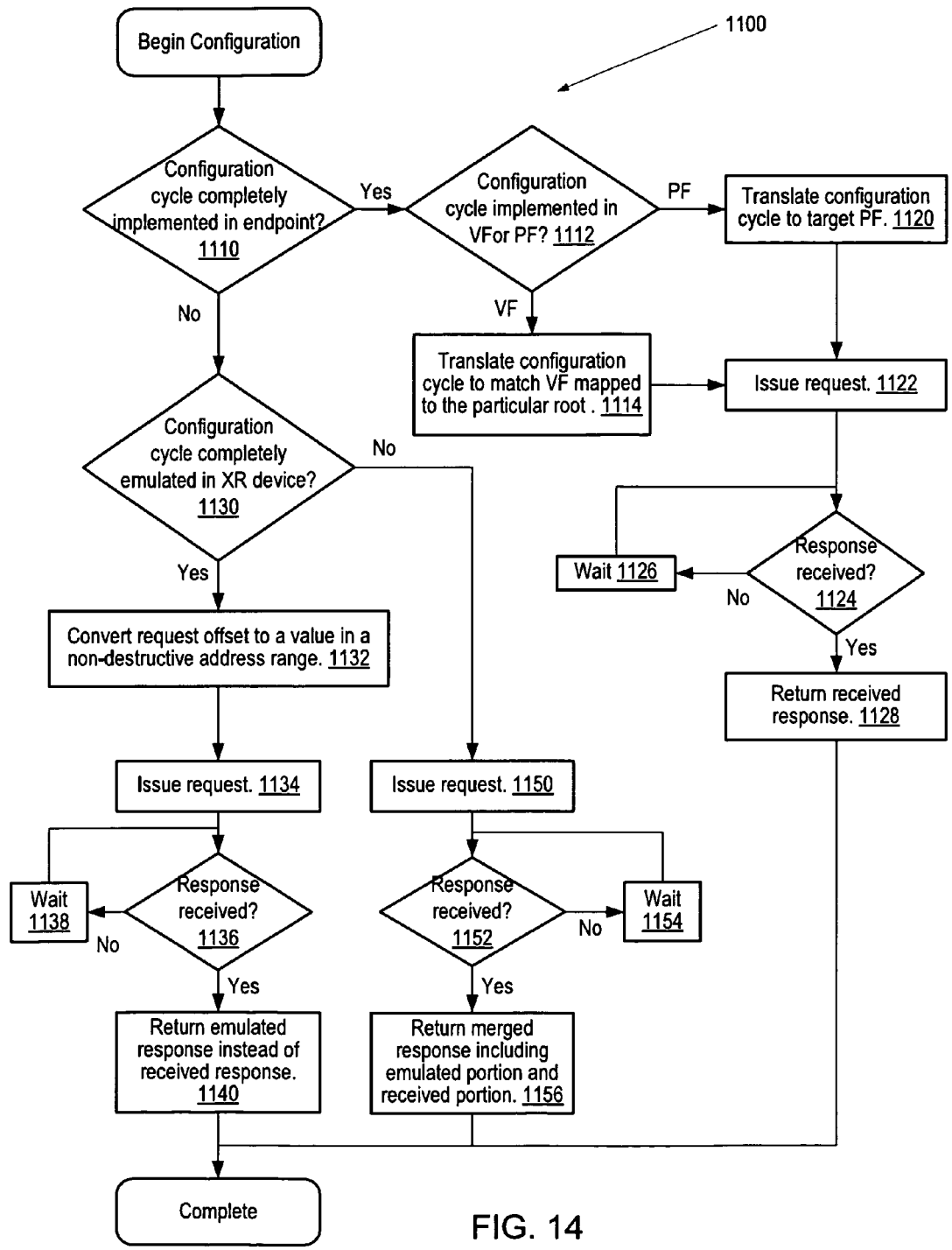
FIG. 14 illustrates one embodiment of a configuration process that may be used by an XR device.

FIG. 14 illustrates one embodiment of a configuration process 1100 that may be used by an XR device. In the illustrated embodiment, a process 1100 begins when an originator such as a driver running in an OS on a root conveys a configuration packet to and endpoint via the XR device. If a configuration cycle is implemented in an SR endpoint (decision block 1110) and the configuration cycle is implemented in the virtual function (decision block 1112), then the XR device may translate the configuration to match the virtual function that is mapped to the originating root (block 1114) and issue a request to the endpoint (block 1122). If configuration cycle is implemented in an SR endpoint and the configuration cycle is implemented in the physical function (decision block 1112), then the XR device may translate the configuration cycle to match the physical function associated with the virtual function that is mapped to the originating root (block 1120) and issue a request to the endpoint (block 1122). After a request is issued the XR device may wait for a response (blocks 1124 and 1126). Once a response is received, the XR device may convey the received response to the originator (block 1128), completing the process 1100.

If a configuration cycle is not implemented in the SR endpoint (decision block 1110) and the configuration cycle is emulated in the XR device (decision block 1130), then the XR device may convert the requested address offset to a value that places the address in a range where access is non-destructive and no response is expected, such as offset equal to zero (block 1132), and issue a request to the endpoint (block 1134). Routing the request to the endpoint even if a response is not expected may maintain the proper ordering of requests. After a request is issued the XR device may wait for a response (blocks 1136 and 1138). Once a completion is received, the XR device may discard the received response and return an emulated response to the originator (block 1140), completing process 1100. If a configuration cycle is not implemented in the SR endpoint (decision block 1110) and the configuration cycle is not fully emulated in the XR device, but is instead shared between the SR endpoint and the XR device (decision block 1130), the XR device may issue a request to the endpoint (block 1150). After a request is issued the XR device may wait for a response (blocks 1152 and 1154). Once a response is received, the XR device may merge a portion of the received response with an emulated portion of the response and convey the result to the originator (block 1156), completing process 1100. It is noted that each field in a register in the configuration header may use a different implementation of the process described above. Consequently, a combination of configuration processes may be used for configuration cycles addressing multiple fields.

Virtual Hierarchies

To simplify the above discussions, XR device 550 has been shown as being included in an MR-IOV switch connected directly to downstream ports of the switch (see, for example, FIG. 5). In alternative embodiments, XR device 550 may be incorporated into any of a variety of more complex virtual hierarchies of PCIe devices. For example, multiple SR endpoints may be coupled to the MR-IOV switch and XR device 550. XR device 550 may map the functions of each underlying SR endpoint into any PCIe hierarchy, thereby allowing software running in that hierarchy to operate as if it "owns" the SR endpoint. In another embodiment, XR device 550 may support a Management VH that may be used to configure the entire PCIe hierarchy of the SR endpoint. This Management VH can be assigned to any VH that is implemented through the MR switch. Also, the Management VH used to manage XR device 550 and the underlying SR endpoint may be changed during operation. In particular, the Management VH may be changed while software running in non-management VH's is actively using the SR endpoint.

Figure 15:
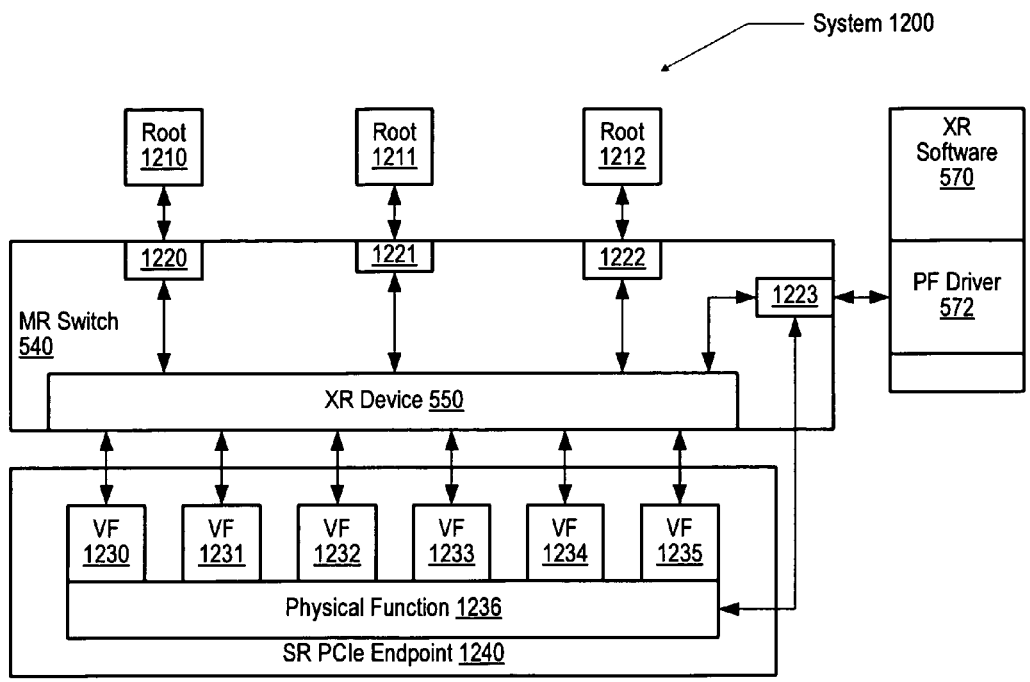
FIG. 15 illustrates an alternative embodiment of an MR system that uses an SR endpoint.

Turning now to FIG. 15, an alternative embodiment of an MR system 1200 that uses an SR endpoint is shown. In the illustrated embodiment, system 1200 includes roots 1210-1212, an MR switch 540, SR PCIe endpoint 1240, and XR software 570. Roots 1210-1212 each may be associated with a single OS and collectively share SR PCIe endpoint 1240 through MR switch 540. MR switch 540 may include ports 1220-1223 and an XR device 550. XR software 570 may include a physical function (PF) driver 572. PF driver 572 is coupled to physical function 1236 via port 1223 of switch 540. SR PCIe endpoint 1240 may include virtual functions 1230-1235 that are associated with a physical function 1236. XR device 550 enables roots 1210-1212 to be bound to virtual functions 1230-1235. The elements illustrated in FIG. 15 generally perform functions similar to the corresponding elements illustrated in FIG. 5.

Figure 16:
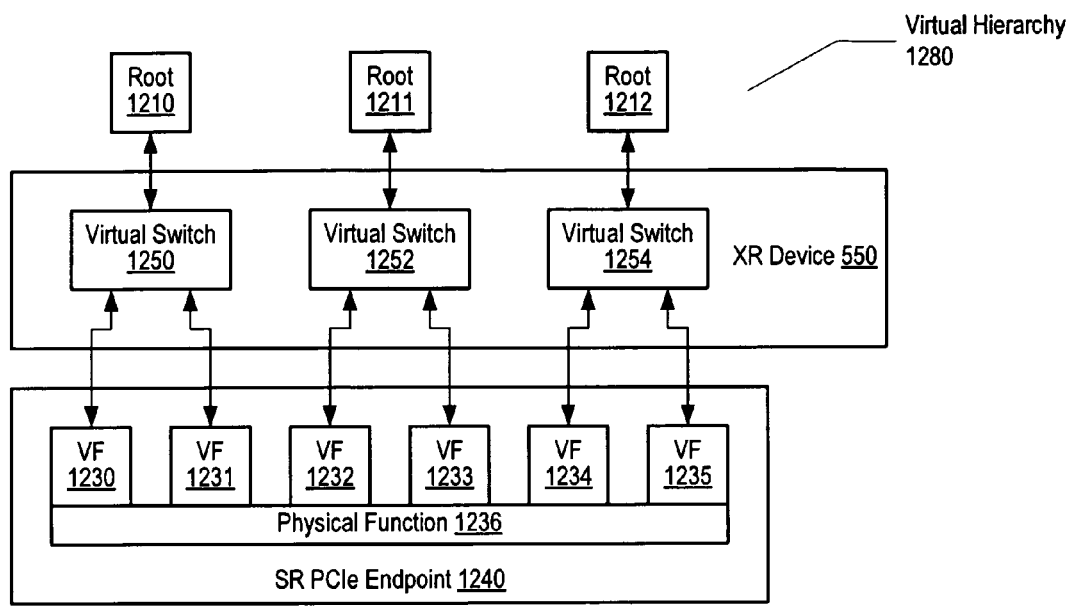
FIG. 16 illustrates a set of virtual hierarchies produced by the system illustrated in FIG. 15.

In addition, XR device 550 may assign multiple VF's to distinct functions within a single virtual hierarchy (VH). For instance, as illustrated in FIG. 16, XR device 550 may map VF's 1230-1235 to roots 1210-1212 in a virtual hierarchy 1280. More particularly, XR device 550 may map VF 1230 and VF 1231 through a virtual switch 1250 to root 1210; XR device 550 may map VF 1232 and VF 1233 through a virtual switch 1252 to root 1211; and XR device 550 may map VF 1234 and VF 1235 through a virtual switch 1254 to root 1212.

Figure 17:
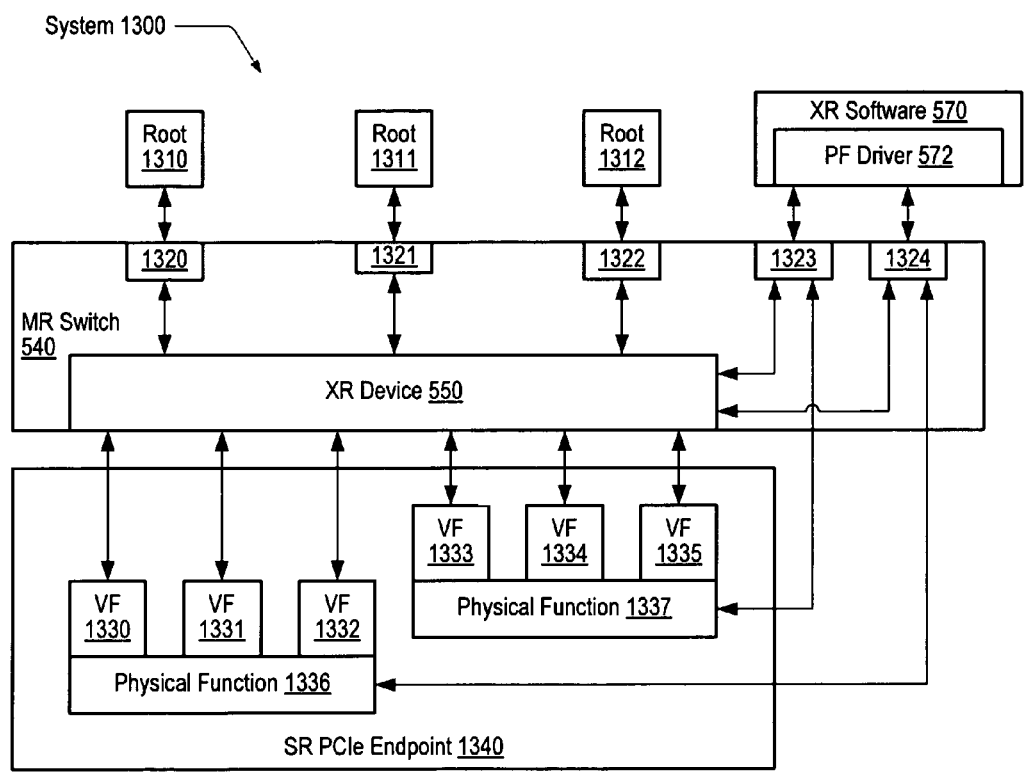
FIG. 17 illustrates yet another alternative embodiment of an MR system that uses an SR endpoint

FIG. 17 illustrates yet another alternative embodiment of an MR system 1200 that uses an SR endpoint. In the illustrated embodiment, system 1300 includes roots 1310-1312, an MR switch 540, SR PCIe endpoint 1340, and XR software 570. Roots 1310-1312 each may be associated with a single OS and collectively share SR PCIe endpoint 1340 through MR switch 540. MR switch 540 may include ports 1320-1324 and an XR device 550. XR software 570 may include a physical function (PF) driver 572. PF driver 572 is coupled to physical functions 1336 and 1337 via ports 1324 and 1323, respectively, of switch 540. SR PCIe endpoint 1340 may include virtual functions 1330-1332 that are associated with a first physical function 1336 and virtual functions 1333-1335 that are associated with a second physical function 1337. XR device 550 enables roots 1310-1312 to be bound to virtual functions 1330-1335. The elements illustrated in FIG. 17 generally perform functions similar to the corresponding elements illustrated in FIG. 5.

Figure 18:
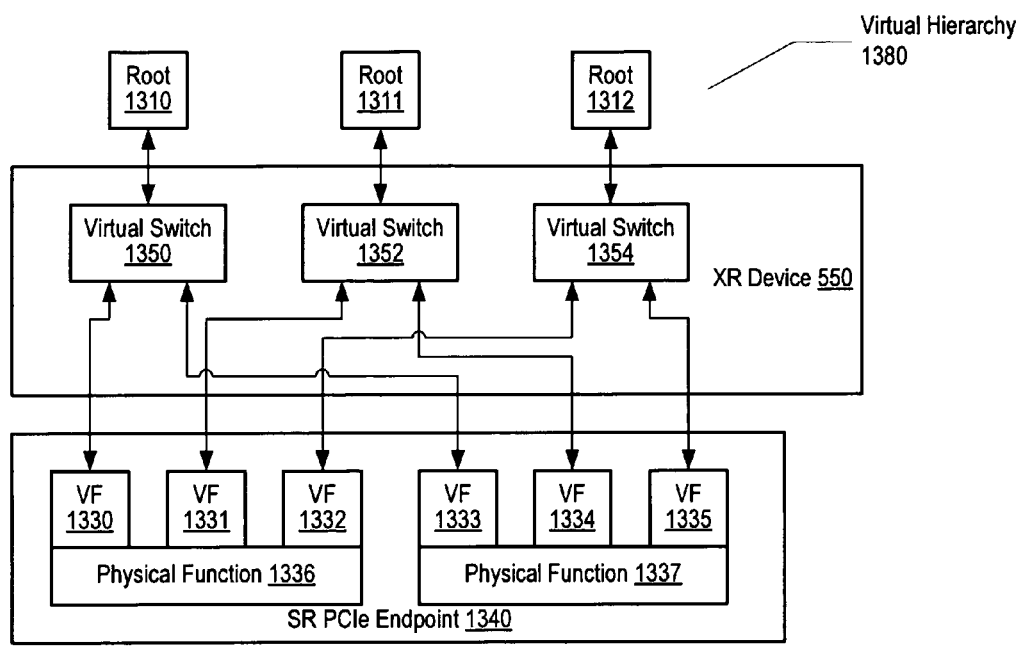
FIG. 18 illustrates a set of virtual hierarchies produced by the system illustrated in FIG. 17.

In addition, XR device 550 may assign multiple VF's to distinct functions within a single virtual hierarchy (VH). For instance, as illustrated in FIG. 18, XR device 550 may map VF's 1330-1335 to roots 1310-1312 in a virtual hierarchy 1380. More particularly, XR device 550 may map VF 1330 and VF 1333 through a virtual switch 1350 to root 1310; XR device 550 may map VF 1331 and VF 1334 through a virtual switch 1352 to root 1311; and XR device 550 may map VF 1332 and VF 1335 through a virtual switch 1354 to root 1312. It is noted that each virtual switch forms a hierarchy in which VF's that are associated with two different PF's are coupled to a root. A variety of additional virtual hierarchies may be enabled by XR device 550, as will be apparent to one of ordinary skill in the art.

In the preceding embodiments, XR device 550 has been shown in configurations in which an SR PCIe endpoint is directly attached below the XR device 550 hardware. In alternative embodiments, XR device 550 may be incorporated into configurations where the SR PCIe endpoint is not directly attached to XR device 550 and an arbitrary number of levels of switching hierarchy are present between XR device 550 and the SR PCIe endpoint. In these embodiments, XR device 550 may be configured to issue PCIe Type 1 configuration cycles instead of Type 0 configuration cycles so that the cycles can be routed through the switching hierarchy to get to the SR PCIe endpoint.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. Additionally, while various flow charts have been presented, it is to be understood that the flowcharts are not intended to indicate a strict ordering of events or activities. Rather, various events and/or activities shown in the flowcharts may occur in a different order than that shown and in some cases events and/or activities may generally occur concurrently. All such embodiments are contemplated. It is intended that the following claims be interpreted to embrace all such variations and modifications.

What is claimed is:

1. A method for use in a PCI Express system comprising a plurality of independent PCI Express roots coupled to a shared single-root input/output virtualization (SR-IOV) endpoint via a bridge device, the method comprising:
   a first root of the plurality of independent PCI Express roots independently assigning a first address in a first root local memory space to a first virtual function of the SR-IOV endpoint, wherein the first root corresponds to a first virtual hierarchy (VH) in the PCI Express system, and a second root of the plurality of independent PCI Express roots assigning a second address in a second root local memory space to a second virtual function of the SR-IOV endpoint, wherein the second root corresponds to a second VH in the PCI Express system that is different from the first VH;
   mapping in the bridge device the first root local memory space to a first portion of the SR-IOV endpoint local memory space, and mapping the second root local memory space to a second portion of the SR-IOV endpoint local memory space, whereby both the first root local memory space and the second root local memory space are concurrently mapped to the SR-IOV endpoint local memory space;
   performing in the bridge device:
      receiving a first request from the first root without an identification of which of said roots is a source of the first request, the first request comprising a first target address;
      receiving a second request from the second root without an identification of which of said roots is a source of the second request, the second request comprising a second target address;
      identifying a source of the first request based at least in part on a port via which the first request was received;
      identifying a source of the second request based at least in part on a port via which the second request was received;
      determining a target of each of the first request and the second request based at least in part on an identification of a source of the first request and the second request, respectively; and
      conveying both of the first request and the second request to the SR-IOV endpoint with an identification of which of said plurality of independent PCI Express roots is a source of the first request and the second request, respectively.

2. The method of claim 1, further comprising:
   translating the first target address to a first translated address in a first address space; and
   translating the second address to a second translated address in a second address space, the second address space being different from the first address space;
   wherein the first request conveyed to the SR-IOV endpoint includes the first translated address, and wherein the second request conveyed to the SR-IOV endpoint includes the second translated address.

3. The method of claim 2, wherein the first target address and the second target address are the same.

4. The method of claim 2, wherein the first request corresponds to a first virtual function in the SR-IOV endpoint, and the second request corresponds to a second virtual function in the SR-IOV endpoint.

5. The method of claim 4, wherein the first virtual function and the second virtual function both correspond to a same physical function in the SR-IOV endpoint.

6. The method of claim 1, wherein the identification of a source of the first request and the second request is based at least in part on a port via which a given root is coupled to the bridge device.

7. The method of claim 1, wherein the first request includes a requester ID (RID) that does not identify a specific virtual hierarchy (VH), and wherein the method further comprises:
   the bridge device modifying the requester ID to a VH identifier (VH ID) that identifies a specific VH to which the first request corresponds; and
   conveying the first request to the shared SR-IOV endpoint with the VH ID and without the RID.

8. A computer system comprising:
   a shared single-root input/output virtualization (SR-IOV) endpoint;
   a plurality of independent PCI Express roots coupled to the shared SR-IOV endpoint via a bridge device utilizing a PCI Express protocol;
   wherein a first root of the plurality of independent PCI Express roots is configured to independently assign a first address in a first root local memory space to a first virtual function of the SR-IOV endpoint, wherein the first root corresponds to a first virtual hierarchy (VH) in the PCI Express system and a second root of the plurality of independent PCI Express roots is configured to independently assign a second address in a second root local memory space to a second virtual function of the SR-IOV endpoint, wherein the second root corresponds to a second VH in the PCI Express system that is different from the first VH;
   wherein the bridge device is configured to:
      map the first root local memory space to a first portion of the SR-IOV endpoint local memory space, and map the second root local memory space to a second portion of the SR-IOV endpoint local memory space, whereby both the first root local memory space and the second root local memory space are concurrently mapped to the SR-IOV endpoint local memory space;
      receive a first request from a first root of the plurality of roots without an identification of which of said plurality of independent roots is a source of the first request, the first request comprising a first target address;
      receive a second request from a second root of the plurality of roots without an identification of which of said plurality of independent roots is a source of the second request, the second request comprising a second target address;
      identify a source of the first request based at least in part on a port via which the first request was received;
      identify a source of the second request based at least in part on a port via which the second request was received;
      determine a target of each of the first request and the second request based at least in part on an identification of a source of the first request and the second request, respectively;

convey both of the first request and the second request to the SR-IOV endpoint with an identification of which of said plurality of independent PCI Express roots is a source of the first request and the second request, respectively.

9. The system of claim 8, wherein the bridge device is further configured to:
translate the first target address to a first translated address in a first address space; and
translate the second address to a second translated address in a second address space, the second address space being different from the first address space;
wherein the first request conveyed to the SR-IOV endpoint includes the first translated address, and wherein the second request conveyed to the SR-IOV endpoint includes the second translated address.

10. The system of claim 9, wherein the first and the second target addresses are the same.

11. The system of claim 9, wherein the first request corresponds to a first virtual function in the SR-IOV endpoint, and the second request corresponds to a second virtual function in the SR-IOV endpoint.

12. The system of claim 11, wherein the first virtual function and the second virtual function both correspond to a same physical function in the SR-IOV endpoint.

13. The system of claim 8, wherein the identification of a source of the first request and the second request is based at least in part on a port via which a given root is coupled to the bridge device.

14. The system of claim 8, wherein the first request includes a requester ID (RID) that does not identify a specific virtual hierarchy (VH), and wherein the bridge device is further configured to:
modify the requester ID to a VH identifier (VH ID) that identifies a specific VH to which the first request corresponds; and
convey the first request to the shared SR-IOV endpoint with the VH ID and without the RID.

15. A bridge device for coupling a shared single-root input/output virtualization (SR-IOV) endpoint to a plurality of independent PCI Express roots, wherein a first root of the plurality of independent PCI Express roots independently assigns a first address in a first root local memory space to a first virtual function of the SR-IOV endpoint, and a second root of the plurality of independent PCI Express roots assigns a second address in a second root local memory space to a second virtual function of the SR-IOV endpoint, where the bridge device is configured to:
map the first root local memory space to a first portion of the SR-IOV endpoint local memory space, and map the second root local memory space to a second portion of SR-IOV endpoint local memory space, whereby both the first root local memory space and the second root local memory space are concurrently mapped to the SR-IOV endpoint local memory space, and wherein the first root corresponds to a first virtual hierarchy (VH) in the PCI Express system and the second root corresponds to a second VH in the PCI Express system that is different from the first VH;
receive a first request from a first root of the plurality of roots without an identification of which of said plurality of independent roots is a source of the first request, the first request comprising a first target address;
receive a second request from a second root of the plurality of roots without an identification of which of said plurality of independent roots is a source of the second request, the second request comprising a second target address;
identify a source of the first request based at least in part on a port via which the first request was received;
identify a source of the second request based at least in part on a port via which the second request was received;
determine a target of each of the first request and the second request based at least in part on an identification of a source of the first request and the second request, respectively;
convey both of the first request and the second request to the SR-IOV endpoint with an identification of which of said plurality of independent PCI Express roots is a source of the first request and the second request, respectively.

16. The bridge device of claim 15, wherein the bridge device is further configured to:
translate the first target address to a first translated address in a first address space; and
translate the second address to a second translated address in a second address space, the second address space being different from the first address space;
wherein the first request conveyed to the SR-IOV endpoint includes the first translated address, and wherein the second request conveyed to the SR-IOV endpoint includes the second translated address.

17. The bridge device of claim 16, wherein the first and the second target addresses are the same.

18. The bridge device of claim 16, wherein the first request corresponds to a first virtual function in the SR-IOV endpoint, and the second request corresponds to a second virtual function in the SR-IOV endpoint.

19. The bridge device of claim 18, wherein the first virtual function and the second virtual function both correspond to a same physical function in the SR-IOV endpoint.

20. The bridge device of claim 15, wherein the identification of a source of the first request and the second request is based at least in part on a port via which a given root is coupled to the bridge device.

21. The bridge device of claim 15, wherein the first request includes a requester ID (RID) that does not identify a specific virtual hierarchy (VH), and wherein the bridge device is further configured to:
modify the requester ID to a VH identifier (VH ID) that identifies a specific VH to which the first request corresponds; and
convey the first request to the shared SR-IOV endpoint with the VH ID and without the RID.

22. The method of claim 1, wherein identifying said source of the first request comprises identifying a root that is the source of the first request, and wherein identifying said source of the second request comprises identifying a root that is the source of the second request.

23. The system of claim 22, wherein the first request and the second request received by the SR-IOV endpoint are received in respective packets which do not include a field for a identifying a source of the respective packets, and wherein the identification of which of said roots is a source of the respective packets is encoded in a field designated for other purposes.

24. The bridge device of claim 15, wherein identifying said source of the first request comprises identifying a root that is the source of the first request, and wherein identifying said source of the second request comprises identifying a root that is the source of the second request.

* * * * *